US006781077B2

(12) United States Patent
Olodort et al.

(10) Patent No.: US 6,781,077 B2
(45) Date of Patent: Aug. 24, 2004

(54) KEYSWITCH AND ACTUATOR STRUCTURE

(75) Inventors: Robert Olodort, Santa Monica, CA (US); John Tang, San Carlos, CA (US); Peter M. Cazalet, Campbell, CA (US); Russell Mead, Mountain View, CA (US)

(73) Assignee: Think Outside, Inc., Carlsbad, CA (US)

( * ) Notice: Subject to any disclaimer, the term of this patent is extended or adjusted under 35 U.S.C. 154(b) by 299 days.

(21) Appl. No.: 09/738,000

(22) Filed: Dec. 14, 2000

(65) Prior Publication Data

US 2002/0092739 A1 Jul. 18, 2002

(51) Int. Cl.[7] .............................................. H01M 13/705
(52) U.S. Cl. ........................................ 200/344; 200/345
(58) Field of Search ................................. 200/512–517, 200/5 A, 341–345; 400/490–495, 472, 473; 361/679–682

(56) References Cited

U.S. PATENT DOCUMENTS

| | | |
|---|---|---|
| 1,982,706 A | 12/1934 | Teetor |
| 2,550,250 A | 4/1951 | Huppert |
| 2,604,315 A | 7/1952 | Patterson |

(List continued on next page.)

FOREIGN PATENT DOCUMENTS

| | | |
|---|---|---|
| DE | 195 02 704 A1 | 8/1996 |
| DE | 196 48 802 A1 | 5/1998 |
| EP | 0660335 A1 | 6/1995 |
| EP | 0966010 A2 | 12/1999 |
| EP | 966010 A2 * | 12/1999 |
| EP | 1049119 A2 | 11/2000 |
| FR | 373199 A | 5/1907 |
| GB | 2279617 | 1/1995 |
| GB | 2315162 A * | 1/1998 |
| GB | 2315162 A | 1/1998 |
| JP | 55-096516 A * | 7/1980 |
| JP | 55096516 A | 7/1980 |
| JP | 05-109333 A * | 4/1993 |
| WO | WO 99/18491 | 9/1998 |
| WO | WO 99/26125 | 11/1998 |

OTHER PUBLICATIONS

Patent Abstracts of Japan, Publication No. 05–109333. Publication Date Apr. 30, 1993, Applicant: :NEC Tohoku Ltd, 2pp.*

Patent Abstracts of Japan, Publication No. 06–103851 A Publication Date: Apr. 15, 1994 Applicant:Fujitsu Ltd. 2pp.*

Patent Abstracts of Japan, vol. 18, No. 369, Publication No. 06103851, Publication Date Apr. 15, 1994, Applicant: Fujitsu Ltd. (1 page).

PCT International Search Report for PCT Int'l Appin No. US/01 /49492, mailed Sep. 26, 2002 (8 pages).

PCT International Search Report for PCT Int'l Appln No. US/01 /50538, mailed Sep. 30, 2002 (8 pages).

(List continued on next page.)

*Primary Examiner*—James R. Scott
(74) *Attorney, Agent, or Firm*—Blakely, Sokoloff, Taylor & Zafman, LLP

(57) ABSTRACT

A keyswitch is described that may include two legs interleaved together without a pivot point approximately central to the legs. The keyswitch may also include a spring to engage at least one of the bottom surfaces of the legs. In one configuration, the legs of the keyswitch may each have two lower protrusions on one of their ends and upper protrusions on their other ends with the lower protrusions of one leg disposed between the lower protrusions of the other leg. The keyswitch may also include a base having retaining clips with each of the lower protrusions of the legs pivotally engaged with a corresponding retaining clip. The keyswitch may also include a cap having tabs that may be pivotally coupled with corresponding slots in the upper protrusions of the legs.

34 Claims, 30 Drawing Sheets

U.S. PATENT DOCUMENTS

| | | | | |
|---|---|---|---|---|
| 2,956,795 | A | | 10/1960 | Foster |
| 3,174,685 | A | | 3/1965 | Swanson |
| 3,499,515 | A | | 3/1970 | Mikrut |
| 3,574,335 | A | | 4/1971 | Ricke |
| 3,576,569 | A | | 4/1971 | Watson |
| 3,693,123 | A | | 9/1972 | Pedersen |
| 3,703,040 | A | | 11/1972 | Hill |
| 3,774,309 | A | | 11/1973 | Leopoldi |
| 3,849,611 | A | | 11/1974 | Walker, Jr. |
| 3,893,559 | A | | 7/1975 | Hishida et al. |
| 3,909,564 | A | | 9/1975 | Scheingold et al. |
| 3,940,758 | A | | 2/1976 | Margolin |
| 3,969,600 | A | * | 7/1976 | Sims, Jr. .................... 200/516 |
| 3,999,319 | A | | 12/1976 | Musgrave |
| 4,050,702 | A | | 9/1977 | Del Matto |
| RE29,440 | E | | 10/1977 | Durkee et al. |
| 4,066,850 | A | | 1/1978 | Heys, Jr. |
| 4,068,369 | A | | 1/1978 | Kaminski |
| 4,070,764 | A | | 1/1978 | Rohlinger |
| 4,092,527 | A | | 5/1978 | Luecke |
| D254,554 | S | | 3/1980 | Genaro et al. |
| RE30,435 | E | | 11/1980 | Fukao |
| 4,314,113 | A | | 2/1982 | Nelson |
| 4,314,133 | A | | 2/1982 | Pfau et al. .................. 200/5 R |
| RE30,923 | E | | 5/1982 | Durkee et al. |
| 4,336,530 | A | | 6/1982 | Koike et al. |
| 4,354,068 | A | | 10/1982 | Sobol, III |
| 4,360,716 | A | | 11/1982 | Fiorella |
| 4,362,911 | A | | 12/1982 | Sears et al. |
| 4,363,134 | A | | 12/1982 | Murata et al. |
| 4,366,463 | A | | 12/1982 | Barker |
| 4,368,364 | A | | 1/1983 | Harbers, Jr. |
| 4,370,533 | A | | 1/1983 | Kamei et al. |
| 4,371,760 | A | | 2/1983 | Muller |
| 4,375,017 | A | | 2/1983 | Smith |
| 4,390,866 | A | | 6/1983 | Engstrom |
| 4,392,037 | A | | 7/1983 | Fleming |
| 4,423,294 | A | | 12/1983 | Walser et al. |
| 4,433,225 | A | | 2/1984 | Cowles |
| 4,440,990 | A | | 4/1984 | Nozaki |
| 4,453,063 | A | | 6/1984 | Wanatowicz, Jr. et al. |
| 4,517,660 | A | | 5/1985 | Fushimoto et al. |
| 4,560,844 | A | | 12/1985 | Takamura et al. |
| 4,580,022 | A | | 4/1986 | Oelsch et al. |
| 4,582,967 | A | | 4/1986 | Brumit et al. |
| 4,597,681 | A | | 7/1986 | Hodges |
| 4,605,828 | A | | 8/1986 | Gostomski, Jr. et al. |
| 4,633,227 | A | | 12/1986 | Menn |
| 4,638,151 | A | | 1/1987 | Suwa |
| 4,661,005 | A | | 4/1987 | Lahr |
| RE32,419 | E | | 5/1987 | Rooney |
| 4,735,520 | A | | 4/1988 | Suzuki et al. |
| 4,739,451 | A | | 4/1988 | Kuba |
| 4,771,146 | A | | 9/1988 | Suzuki et al. |
| D299,030 | S | | 12/1988 | Menn |
| 4,793,601 | A | | 12/1988 | Wild et al. |
| 4,795,888 | A | | 1/1989 | MacFarlane |
| 4,815,784 | A | | 3/1989 | Zheng |
| 4,848,828 | A | | 7/1989 | Hunt |
| 4,850,233 | A | | 7/1989 | Ishigo |
| 4,885,430 | A | | 12/1989 | Kinser, Jr. et al. |
| 4,885,891 | A | | 12/1989 | Lynch |
| 4,902,862 | A | | 2/1990 | Oelsch et al. |
| 4,914,999 | A | | 4/1990 | Masubuchi et al. |
| 4,920,237 | A | | 4/1990 | Eardley et al. |
| 4,939,514 | A | | 7/1990 | Miyazaki |
| 4,942,700 | A | | 7/1990 | Hoberman |
| 4,948,232 | A | | 8/1990 | Lange |
| 4,951,333 | A | | 8/1990 | Kaiser et al. |
| 4,996,522 | A | | 2/1991 | Sunano |
| 5,003,140 | A | | 3/1991 | Abell, Jr. et al. |
| 5,024,031 | A | | 6/1991 | Hoberman |
| 5,024,262 | A | | 6/1991 | Huang |
| 5,034,573 | A | | 7/1991 | Bonmassari et al. |
| 5,035,460 | A | | 7/1991 | Huang |
| 5,038,812 | A | | 8/1991 | Norman |
| 5,044,798 | A | | 9/1991 | Roylance et al. |
| 5,047,952 | A | | 9/1991 | Kramer et al. |
| 5,049,862 | A | | 9/1991 | Dao et al. |
| 5,054,849 | A | | 10/1991 | Hoff |
| 5,056,172 | A | | 10/1991 | Kaiser et al. |
| 5,067,834 | A | | 11/1991 | Szmanda et al. |
| D322,246 | S | | 12/1991 | Izaki |
| 5,070,330 | A | | 12/1991 | Wu |
| D324,035 | S | | 2/1992 | Izaki |
| 5,115,106 | A | | 5/1992 | Weiland et al. |
| 5,122,786 | A | | 6/1992 | Rader |
| 5,126,725 | A | | 6/1992 | Yanagisawa |
| 5,137,384 | A | | 8/1992 | Spencer et al. |
| 5,141,343 | A | | 8/1992 | Roylance et al. |
| 5,163,765 | A | | 11/1992 | Levy |
| 5,164,723 | A | | 11/1992 | Nebenzahl |
| 5,167,100 | A | | 12/1992 | Krishnapillai |
| 5,187,644 | A | | 2/1993 | Crisan |
| 5,198,991 | A | | 3/1993 | Pollitt |
| 5,210,846 | A | | 5/1993 | Lee |
| 5,212,372 | A | | 5/1993 | Quick et al. |
| 5,212,473 | A | | 5/1993 | Louis |
| 5,215,187 | A | | 6/1993 | Ping-Chieng et al. |
| 5,220,521 | A | | 6/1993 | Kikinis |
| 5,227,615 | A | | 7/1993 | Oogita |
| 5,252,971 | A | | 10/1993 | Franz et al. |
| 5,256,843 | A | | 10/1993 | Chiba et al. |
| 5,267,127 | A | | 11/1993 | Pollitt |
| 5,268,545 | A | | 12/1993 | Bruner |
| 5,269,004 | A | | 12/1993 | Comerford et al. |
| 5,278,371 | A | | 1/1994 | Watanabe et al. |
| 5,278,372 | A | | 1/1994 | Takagi et al. |
| 5,278,374 | A | | 1/1994 | Takagi et al. |
| 5,278,725 | A | | 1/1994 | Konno et al. |
| 5,278,779 | A | | 1/1994 | Conway et al. |
| 5,280,147 | A | | 1/1994 | Mochizuki et al. |
| 5,283,862 | A | | 2/1994 | Lund |
| 5,287,245 | A | | 2/1994 | Lucente et al. |
| 5,289,023 | A | | 2/1994 | Mead |
| 5,289,394 | A | | 2/1994 | Lapeyre, deceased |
| 5,295,089 | A | | 3/1994 | Ambasz |
| 5,298,706 | A | | 3/1994 | English et al. |
| 5,304,764 | A | | 4/1994 | Kobayashi |
| 5,306,886 | A | | 4/1994 | Yamada |
| 5,310,973 | A | | 5/1994 | Lee |
| 5,318,367 | A | | 6/1994 | Braun et al. |
| 5,321,795 | A | | 6/1994 | Alvarez de Toledo |
| 5,324,902 | A | | 6/1994 | Shen |
| 5,329,079 | A | | 7/1994 | English et al. |
| 5,329,084 | A | | 7/1994 | Watanabe et al. |
| 5,334,976 | A | | 8/1994 | Wang |
| 5,336,001 | A | | 8/1994 | Lichtenberg |
| 5,339,097 | A | | 8/1994 | Grant |
| 5,339,213 | A | | 8/1994 | O'Callaghan |
| 5,341,133 | A | | 8/1994 | Savoy et al. |
| 5,341,154 | A | | 8/1994 | Bird |
| 5,345,362 | A | | 9/1994 | Winkler |
| 5,349,303 | A | | 9/1994 | Gerpheide |
| 5,351,843 | A | | 10/1994 | Wichman et al. |
| 5,355,148 | A | | 10/1994 | Anderson |
| 5,355,149 | A | | 10/1994 | Casebolt |
| 5,378,069 | A | | 1/1995 | Bowen |
| 5,382,762 | A | | 1/1995 | Mochizuki |
| 5,383,138 | A | | 1/1995 | Motoyama et al. |
| 5,383,735 | A | | 1/1995 | Smiley |

| | | | | |
|---|---|---|---|---|
| 5,388,922 A | | 2/1995 | Smiley | |
| 5,393,150 A | | 2/1995 | Fort | |
| 5,394,959 A | | 3/1995 | Cullity et al. | |
| 5,398,326 A | | 3/1995 | Lee | |
| 5,398,585 A | | 3/1995 | Starr | |
| 5,399,822 A | | 3/1995 | Sato et al. | |
| 5,410,333 A | | 4/1995 | Conway | |
| 5,410,447 A | | 4/1995 | Miyagawa et al. | |
| 5,416,498 A | | 5/1995 | Grant | |
| 5,422,447 A | | 6/1995 | Spence | |
| 5,424,516 A | | 6/1995 | Emmons | |
| 5,424,728 A | | 6/1995 | Goldstein | |
| 5,426,449 A | | 6/1995 | Danziger | |
| 5,438,177 A | | 8/1995 | Fagan | |
| 5,439,304 A | | 8/1995 | Phillips et al. | |
| 5,440,502 A | | 8/1995 | Register | |
| 5,454,652 A | | 10/1995 | Huellemeier et al. | |
| 5,457,297 A | | 10/1995 | Chen | |
| 5,457,453 A | | 10/1995 | Chiu et al. | |
| 5,459,461 A | | 10/1995 | Crowley et al. | |
| 5,463,195 A | | 10/1995 | Watanabe et al. | |
| 5,466,901 A | | 11/1995 | Mochizuki | |
| 5,476,332 A | | 12/1995 | Cleveland, Jr. | |
| 5,481,074 A | | 1/1996 | English | |
| 5,488,210 A | | 1/1996 | Shigetaka et al. | |
| 5,494,363 A | | 2/1996 | Hochgesang | |
| 5,499,857 A | | 3/1996 | Lynch, Jr. | |
| 5,502,460 A | | 3/1996 | Bowen | |
| 5,504,283 A | | 4/1996 | Kako et al. | |
| 5,512,719 A | | 4/1996 | Okada et al. | |
| 5,519,569 A | | 5/1996 | Sellers | |
| 5,525,979 A | | 6/1996 | Engle et al. | |
| 5,527,875 A | | 6/1996 | Yokoyama et al. | |
| 5,531,529 A | | 7/1996 | Nusser | |
| 5,532,904 A | | 7/1996 | Sellers | |
| 5,543,787 A | | 8/1996 | Karidis et al. | |
| 5,543,790 A | | 8/1996 | Goldstein | |
| 5,555,971 A | | 9/1996 | Takada | |
| 5,557,057 A | | 9/1996 | Starr | |
| 5,562,203 A | | 10/1996 | Mochizuki | |
| 5,574,481 A | | 11/1996 | Lee | |
| 5,575,576 A | | 11/1996 | Roysden, Jr. | |
| 5,579,033 A | | 11/1996 | Rutledge et al. | |
| 5,587,875 A | | 12/1996 | Sellers | |
| 5,588,759 A | | 12/1996 | Cloud | |
| 5,590,020 A | * | 12/1996 | Sellers | 361/680 |
| 5,591,927 A | | 1/1997 | Kawamura et al. | |
| 5,594,067 A | | 1/1997 | Doi et al. | |
| 5,595,449 A | | 1/1997 | Vitkin | |
| 5,596,480 A | | 1/1997 | Manser et al. | |
| 5,597,067 A | | 1/1997 | Yoneyama | |
| 5,602,715 A | * | 2/1997 | Lempicki et al. | 200/344 X |
| 5,610,601 A | | 3/1997 | Lahti et al. | |
| 5,612,691 A | | 3/1997 | Murmann et al. | |
| 5,621,401 A | | 4/1997 | Jeon et al. | |
| 5,621,610 A | | 4/1997 | Moore et al. | |
| 5,625,532 A | | 4/1997 | Sellers | |
| 5,629,694 A | | 5/1997 | Simon et al. | |
| 5,630,501 A | | 5/1997 | Tsay | |
| 5,635,928 A | | 6/1997 | Takagi et al. | |
| 5,642,110 A | | 6/1997 | Raasch et al. | |
| 5,644,338 A | | 7/1997 | Bowen | |
| 5,646,817 A | | 7/1997 | Manser et al. | |
| 5,648,771 A | | 7/1997 | Halgren et al. | |
| 5,653,543 A | | 8/1997 | Abe | |
| 5,654,872 A | | 8/1997 | Sellers | |
| 5,657,860 A | | 8/1997 | Koike et al. | |
| 5,659,307 A | | 8/1997 | Karidis et al. | |
| 5,677,826 A | | 10/1997 | Sellers | |
| 5,684,279 A | | 11/1997 | Burgett | |
| 5,687,058 A | | 11/1997 | Roylance | |
| 5,695,047 A | | 12/1997 | Tanahashi | |
| 5,703,578 A | | 12/1997 | Allison | |
| 5,706,167 A | | 1/1998 | Lee | |
| 5,712,760 A | | 1/1998 | Coulon et al. | |
| 5,733,056 A | | 3/1998 | Meagher | |
| 5,735,390 A | | 4/1998 | Takagi et al. | |
| 5,738,450 A | | 4/1998 | Lukosch | |
| 5,742,475 A | | 4/1998 | Riddiford | |
| 5,763,842 A | | 6/1998 | Tsai et al. | |
| 5,767,464 A | | 6/1998 | Dyer et al. | |
| 5,769,551 A | | 6/1998 | Tsai et al. | |
| 5,772,008 A | | 6/1998 | Yu et al. | |
| 5,774,384 A | | 6/1998 | Okaya et al. | |
| 5,777,281 A | | 7/1998 | Riddiford | |
| 5,779,030 A | * | 7/1998 | Ikegami et al. | 200/344 |
| 5,788,386 A | | 8/1998 | Hayashi et al. | |
| 5,799,772 A | | 9/1998 | Sanda et al. | |
| 5,800,085 A | | 9/1998 | Lee | |
| 5,819,914 A | | 10/1998 | Yoneyama | |
| 5,823,324 A | | 10/1998 | Tsai | |
| 5,828,015 A | | 10/1998 | Coulon | |
| 5,829,579 A | | 11/1998 | Tsai | |
| 5,833,050 A | | 11/1998 | Takagi et al. | |
| 5,842,798 A | | 12/1998 | Su | |
| 5,847,337 A | | 12/1998 | Chen | |
| 5,850,194 A | | 12/1998 | Lin | |
| 5,870,034 A | | 2/1999 | Wood | |
| 5,874,697 A | | 2/1999 | Selker et al. | |
| 5,878,872 A | | 3/1999 | Tsai | |
| 5,894,117 A | | 4/1999 | Kamishima | |
| 5,898,145 A | | 4/1999 | Su | |
| 5,901,837 A | | 5/1999 | Aimi | |
| 5,924,553 A | | 7/1999 | Yeh | |
| 5,926,364 A | | 7/1999 | Karidis | |
| 5,933,133 A | | 8/1999 | Lohr | |
| 5,933,320 A | | 8/1999 | Malhi | |
| 5,934,454 A | | 8/1999 | Burleson et al. | |
| 5,941,648 A | | 8/1999 | Robinson et al. | |
| 5,943,041 A | | 8/1999 | Allison et al. | |
| 5,947,616 A | | 9/1999 | Liang | |
| 5,964,341 A | | 10/1999 | Tsai | |
| 5,967,298 A | | 10/1999 | Watanabe et al. | |
| 5,971,637 A | | 10/1999 | Malhi et al. | |
| 5,973,281 A | * | 10/1999 | Tsai | 200/344 |
| D416,003 S | | 11/1999 | Schiefer et al. | |
| 5,986,227 A | * | 11/1999 | Hon | 200/344 |
| 5,990,433 A | | 11/1999 | Alden, III et al. | |
| 5,994,655 A | | 11/1999 | Tsai | |
| 5,995,025 A | | 11/1999 | Sternglass et al. | |
| 5,997,196 A | | 12/1999 | Hu | |
| 6,004,051 A | | 12/1999 | Hu | |
| 6,005,209 A | | 12/1999 | Burleson et al. | |
| 6,005,767 A | | 12/1999 | Ku et al. | |
| 6,011,227 A | | 1/2000 | Yoneyama | |
| 6,020,565 A | | 2/2000 | Pan | |
| 6,028,768 A | | 2/2000 | Cipolla | |
| 6,031,189 A | | 2/2000 | Watanabe et al. | |
| 6,040,540 A | | 3/2000 | Tsai et al. | |
| 6,040,541 A | | 3/2000 | Li | |
| 6,060,676 A | | 5/2000 | Pan | |
| 6,064,020 A | | 5/2000 | Yamada et al. | |
| 6,068,416 A | | 5/2000 | Kumamoto et al. | |
| 6,080,948 A | | 6/2000 | Hong | |
| 6,087,604 A | | 7/2000 | Suga et al. | |
| 6,091,036 A | * | 7/2000 | Hu | 200/344 |
| 6,107,584 A | * | 8/2000 | Yoneyama | 200/344 |
| 6,137,676 A | | 10/2000 | Merkel | |
| 6,331,850 B1 | * | 12/2001 | Olodort et al. | 361/680 X |

OTHER PUBLICATIONS

Patent Cooperation Trety, PCT Invitation To Pay Addition Fee (PCT Article 17(3)(a) and Rule 40.1), International Application No. PCT/US 01/49492, Applicant Think Outside, Inc., Mailing Date, Jun. 21, 20021, 5 pages attached.

Patent Abstracts Of Japan. vol. 017, No. 460, Aug. 23, 19993, Publication No. 05109333, Publication Date Apr. 30, 1993, Applicant NEC Tohoku Ltd, Inventor Miura Hideki, 1 page attached.

Patent Abstracts of Japan, vol. 1999, No. 09, Jul. 30, 1999, Publication No. 11111101, Publication Date Apr. 23, 1999, Applicant SMK Corp., Inventor Takada Ysau0, 1 page attached.

*Machine Design*, "Scanning for Ideas (continued)," Nov. 25, 1976, vol. 48, No. 27, pp. 1 and 40.

* cited by examiner

KEYSWITCH AND ACTUATOR STRUCTURE

FIELD OF THE INVENTION

This invention relates to the field of keyswitch assemblies and, more specifically, to keyswitches used in keyboards having compact requirements.

BACKGROUND

Small portable computers or "palmtops" can be conveniently carried in a purse or coat pocket. Recent advances in shrinking the size of electronic components, and the rapid growth of the wireless data infrastructure will allow these devices to be conveniently carried and used as portable e-mail machines. At the same time, mobile phones are becoming Internet capable, so can also be used to send and receive e-mail.

Powerful and versatile as these devices are becoming, their use is greatly limited by non-existent or inadequate keyboards. Palmtops which rely on handwriting recognition have proven to be awkward, slow and error prone. Phone keypads are very slow when used to enter text. Keyboards with calculator type "chicklet" keys (e.g., the Zaurus organizer, made by Sharp Electronics) or membrane keys (e.g., microwave oven keys) also slow down typing and suitable only for thumb or index finger typing of short messages.

Voice recognition suffers from frequent errors and creates a lack of privacy and disturbance to others when other people are near the speaker whose voice is being recognized.

Keyboards found in high quality notebook or laptop computers allow the user to comfortably, privately, and quickly "touch-type." They have a number of desirable features in common. Importantly, the keyswitches are designed to provide sufficient "travel" (i.e., the distance the key moves when it is pressed), and tactile feedback (i.e., an over-center buckling action), that signals to the user that the key has been pressed sufficiently. When users type quickly with all fingers, they often strike the keys off center. To prevent the keys from binding, high quality keyswitches use mechanisms that keep the key caps parallel to the base as they are pressed. This allows the keys to be struck on any portion of their surface and at non-perpendicular angles to the direction of depression.

It would be highly desirable in many situations to provide keyswitches which have all the features of the best laptop computer keyboards, yet can be stored in a very thin collapsed position. This would allow the creation of hand-held computers and mobile phones with built in keyboards suitable to comfortable and fast touch typing. It would also allow the creation of accessory keyboards suitable for comfortable and fast touch typing that can be folded to very small sizes.

Efforts have been made to provide keyboards that contain these features, yet have keyswitch mechanisms that are low profile. Some keyswitch designs only slightly reduce the compactness of a keyboard. One such design, illustrated in FIGS. 1A and 1B, utilizes a rubber cone as a spring mechanism and to provide tactile feedback. A problem with such a design is that the levers have substantial thickness to accommodate a shaft and pivot holes at the central part of the levers to allow pivotally movement in a traditional scissors arrangement. As such, the overall thickness of a collapsed keyswitch using such a design may not be significantly reduced. Another problem with the use of a rubber cone is that it may need to be glued to the assembly with an adhesive. A glued spring may result in inaccurate positioning of the cone and/or adhesive spilling over into unwanted areas.

Another compact keyswitch design, illustrated in FIG. 1C uses a gear mechanism to maintain parallel movement of its linkages. It needs a shaft and pivot holes at the center of its gears. The overall thickness of a collapsed keyswitch is thus limited by the diameter of the gears.

Another compact keyswitch design, illustrated in FIG. 1D utilizes a spring mechanism positioned on the ends of interlocking plates, rather than underneath the plates. However, the thickness of this mechanism when collapsed is limited because the levers have flanges on their sides. The flanges are typically used for stiffening of the lever material and to facilitate attachment to the cap. Such a design may only be able to reduce the thickness of the keyswitch in the depressed position (e.g., when used in a foldable keyboard) to around 4 millimeters (mm). Also limiting the collapsed thickness is the fact that the width of the springs is perpendicularly oriented with respect to the levers.

Yet another drawback to this design is that it may be difficult to assemble. Such a design may require a mounting method that spans multiple layers. A circular extruded feature protrudes downward through the membrane switch layer and base metal layer. It then gets swaged to secure the scissors assembly. This is a disadvantage when trying to achieve a thinner design and also limits the flexibility between layers. Each layer must take into consideration this intrusion. In addition, such a mechanism may have to be machine assembled because metal must be bent or swaged to secure the assembly.

SUMMARY OF THE INVENTION

The present invention pertains to a keyswitch. The keyswitch may include two legs interleaved together without a pivot point approximately central to the legs. In one particular embodiment, the sides of the legs may not have flanges and/or hems. In another embodiment, the legs may be undulated at approximately their centers. In yet another embodiment, the keyswitch may also include a spring to engage at least one of the bottom surfaces of the legs.

In one exemplary embodiment, the legs of the keyswitch may each have two lower protrusions on one of their ends and upper protrusions on their other ends with the lower protrusions of one leg disposed between the lower protrusions of the other leg. The keyswitch may also include a base having retaining clips with each of the lower protrusions of the legs pivotally engaged with a corresponding retaining clip. The keyswitch may also include a cap having tabs that may be pivotally coupled with corresponding slots in the upper protrusions of the legs.

In one particular embodiment of the invention, the mechanical action of the keyswitch is designed to feel virtually the same as a high quality laptop computer keyboard so the user can touch-type quickly and comfortably with no learning required. Key travel (the distance the key moves when pushed down) may be approximately 3 mm. When a key is pressed there is also an over-center "buckling" of a spring to create tactile feedback similar to the feedback provided by high-quality keyboards. As such, the keyswitch may provide similar benefits and features of high quality keyswitches as used in laptop or notebook computers, in particular, sufficient key travel, parallel key movement, and tactile feedback. In addition, the keyswitch may be stored in a compressed position of very small thickness that allows it to be used in folding keyboards that may be incorporated into portable devices such as handheld computers and mobile phones.

Additional features and advantages of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings and in which:

FIG. 4A is a three dimensional view.

FIG. 4B is a planer top view.

FIG. 4C is a cross-sectional view.

FIG. 5A is a three dimensional view.

FIG. 5B is a planer top view.

FIG. 5C is a cross-sectional view.

FIG. 6A is a three dimensional view.

FIG. 6B is a planer top view.

FIG. 6C is a cross-sectional view.

FIG. 11A is a three dimensional view.

FIG. 11B is a planer top view.

FIG. 11C is a cross-sectional view.

DETAILED DESCRIPTION

In the following description, numerous specific details are set forth such as examples of specific materials, components, dimensions, etc. in order to provide a thorough understanding of the present invention. It will be apparent, however, to one skilled in the art that these specific details need not be employed to practice the present invention. Moreover, the dimensions provided are only exemplary. In other instances, well known components or properties have not been described in detail in order to avoid unnecessarily obscuring the present invention. In addition, the various alternative embodiments of a keyswitch or spring described in relation to a particular figure may also be applied to the keyswitches and springs described in other figures.

The method and apparatus described herein may be implemented with a collapsible keyboard. It should be noted that the description of the apparatus in relation to a collapsible keyboard is only for illustrative purposes and is not meant to be limited only to collapsible keyboards. In alternative embodiments, the apparatus described herein may be used with other types of keyboards, for examples, a desktop computer keyboard, a notebook computer keyboard, a keyboard on a personal digital assistant (PDA) device or a keyboard on a wireless phone.

Figure 1A:
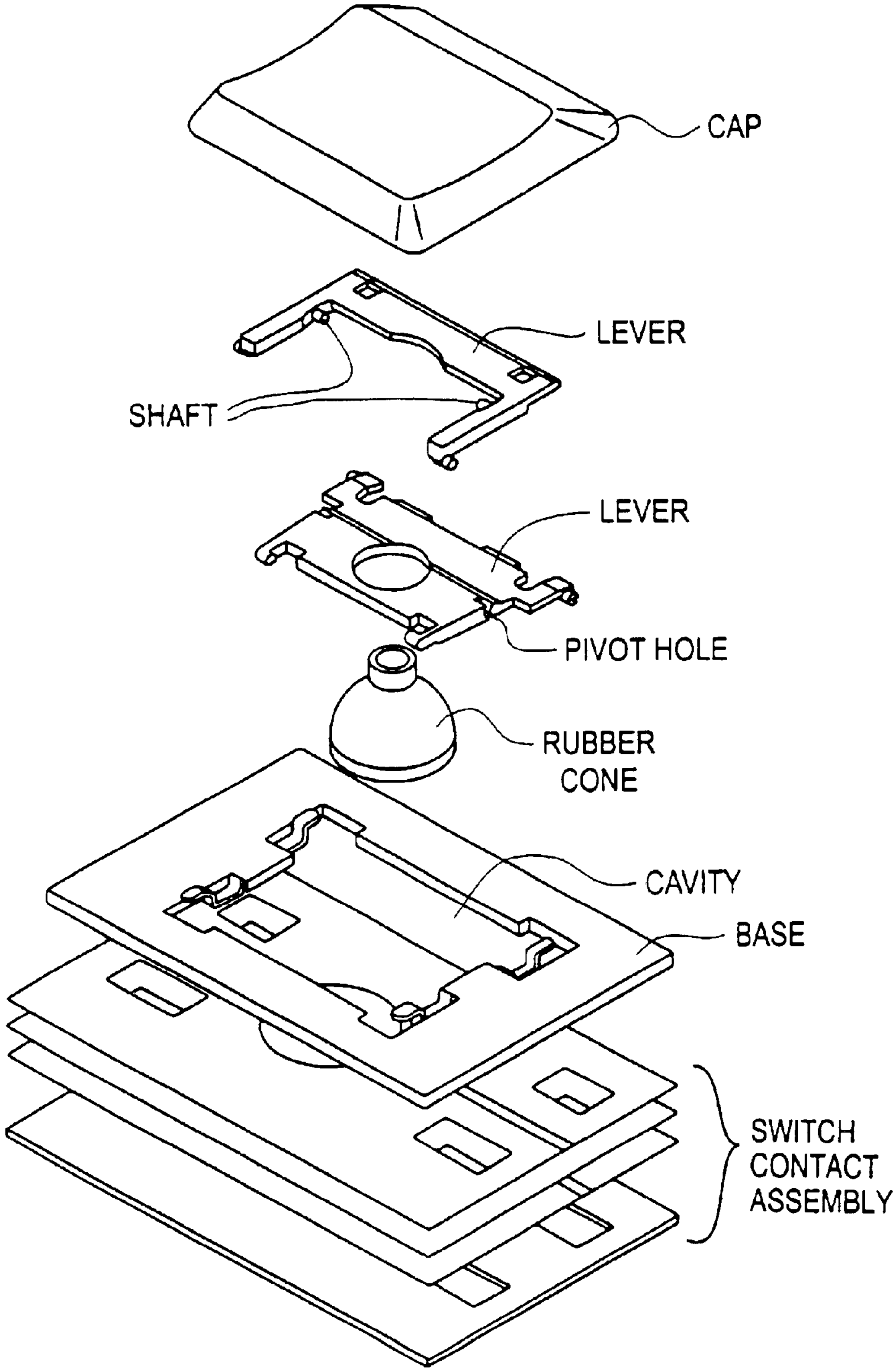
FIG. 1A PRIOR ART
FIGS. 1A and 1B are different perspectives illustrating a prior art keyswitch.
Figure 1B:
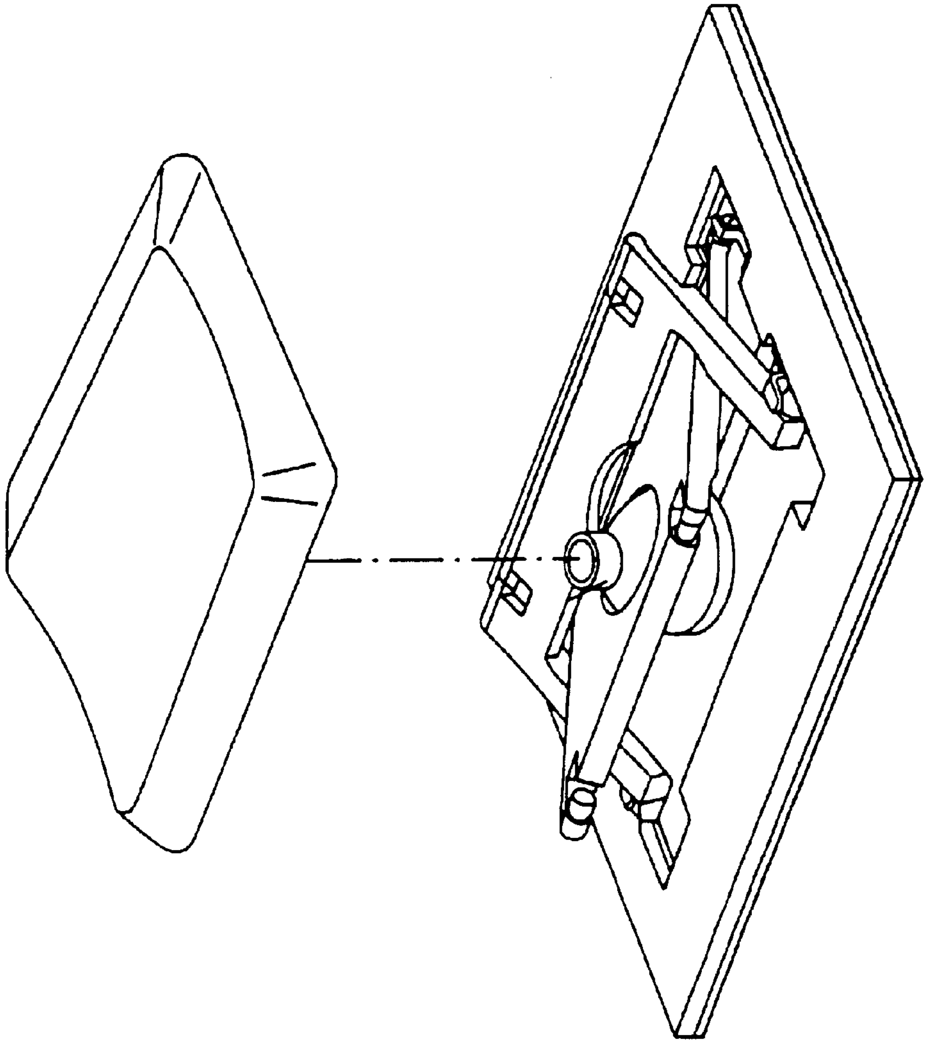
FIG. 1B PRIOR ART
Figure 1C:
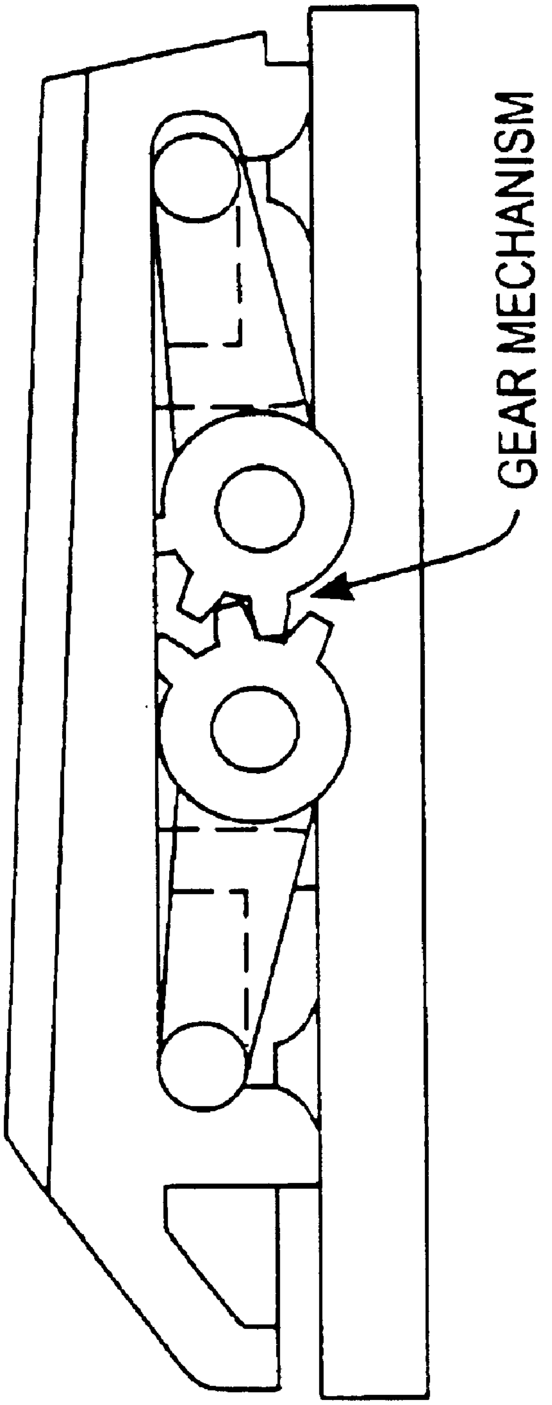
FIG. 1C PRIOR ART
FIG. 1C illustrates another prior art keyswitch.
Figure 1D:
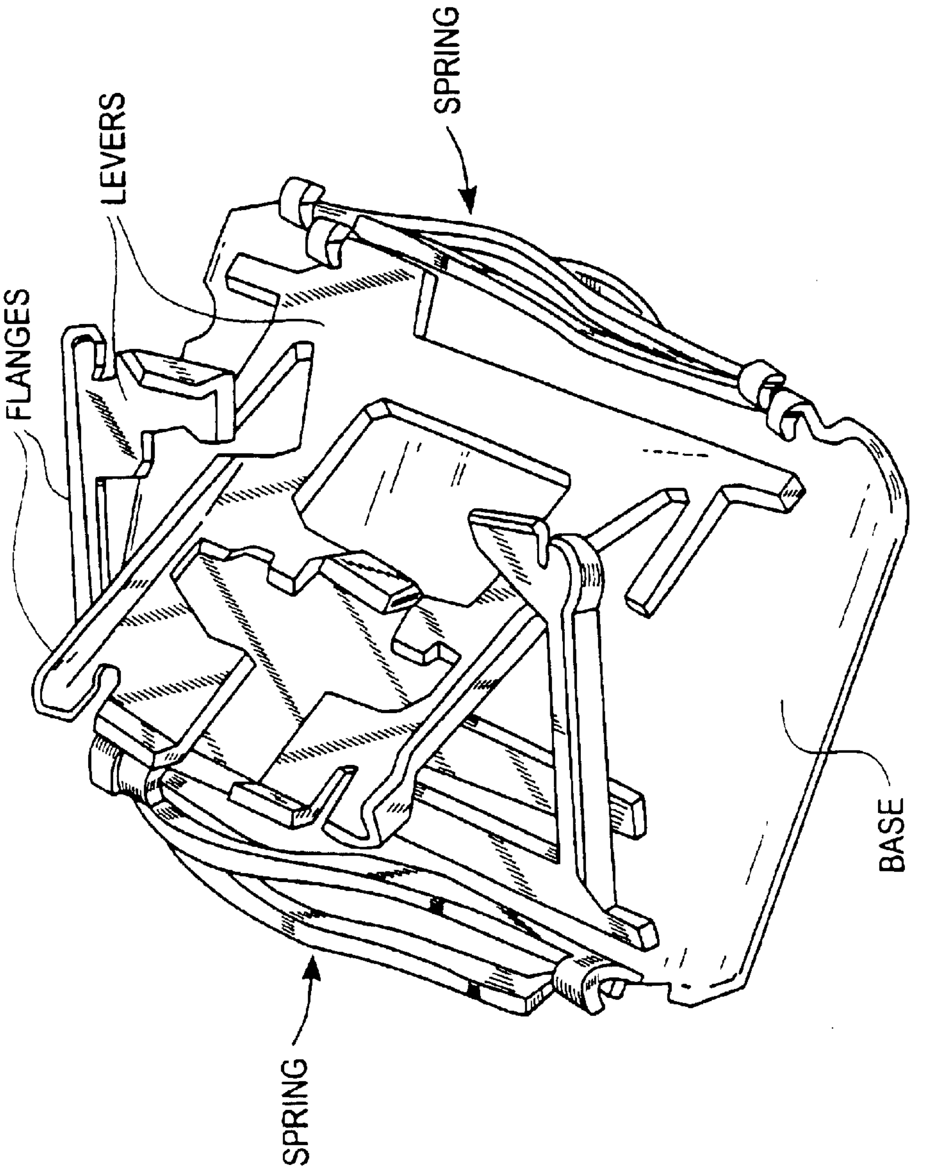
FIG. 1D PRIOR ART
FIG. 1D illustrates yet another prior art keyswitch.
Figure 2A:
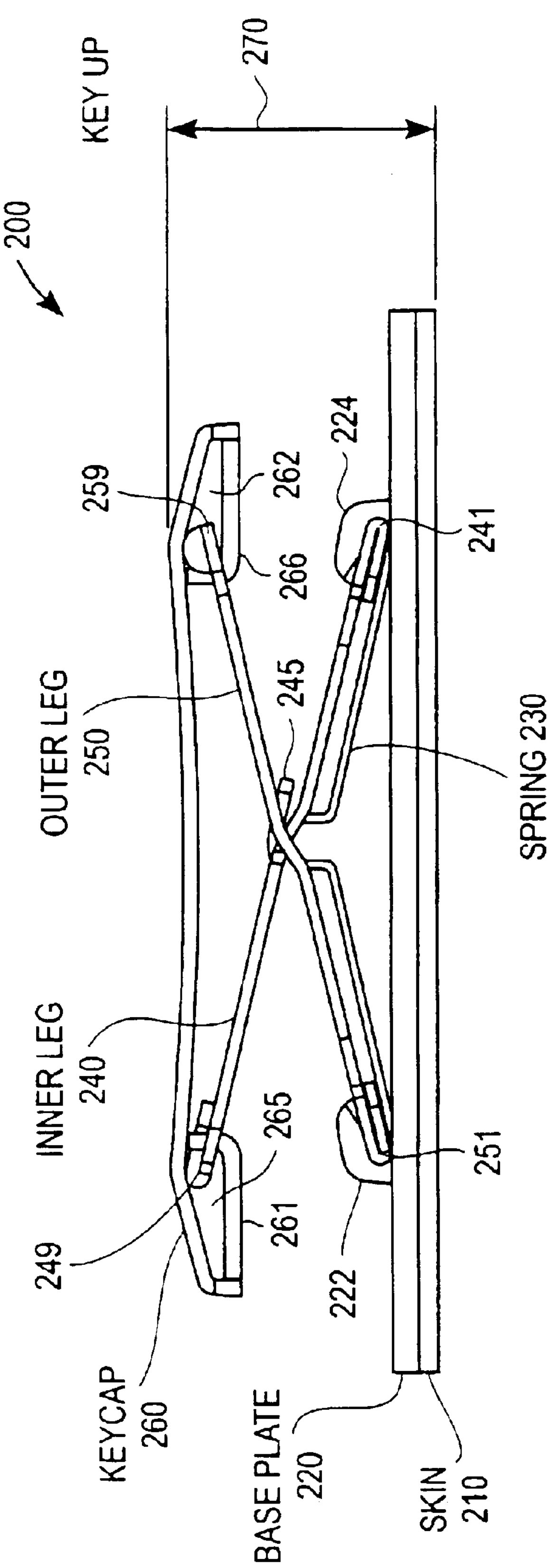
FIG. 2A is a cross-sectional view illustrating one embodiment of a keyswitch assembly in an extended position.

FIG. 2A is a cross-sectional view illustrating one embodiment of a keyswitch assembly in an extended position. Keyswitch 200 is shown in the up position that it normally resides in when not being depressed either by a user or by the collapsing of a keyboard on which it is contained. In one embodiment, keyswitch assembly 200 includes a sheet member ("skin") 210, a base plate 220, a spring 230, legs 240 and 250, and cap 260.

Figure 2B:
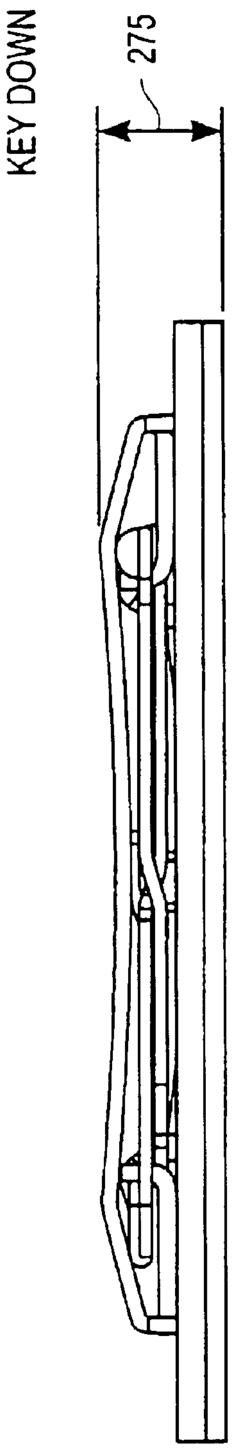
FIG. 2B is a cross-sectional view illustrating one embodiment of a keyswitch assembly in a depressed position.

A flex membrane (not shown) is disposed between base plate 220 and skin 210. The flex membrane is a flexible conductor that is used to actuate the electrical operation of keyswitch 200. The flex membrane may consist of one or more layers of flexible material disposed on or in a flexible film. For example, a single-layer conductor may have circuits applied to one face of a flexible material. It may have a pattern of open contacts under each key where base plate 220 has an opening. When keyswitch 200 is depressed into its down position, illustrated in FIG. 2B, an electrically conductive puck attached to the key shorts the contacts, which completes an electrical circuit. A flex membrane is known in the art; accordingly, a detailed discussion is not provided herein.

Figure 3A:
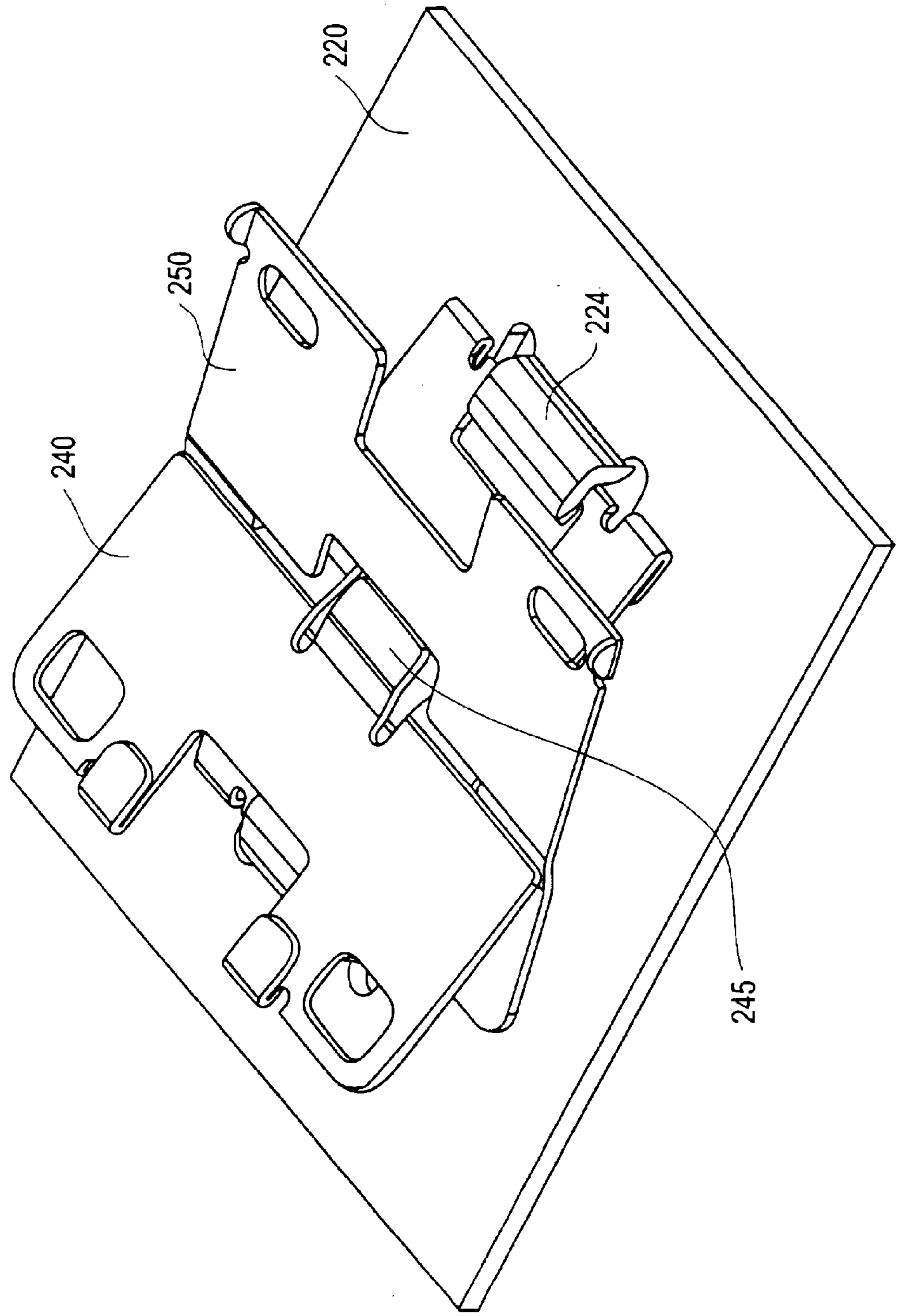
FIG. 3A is a perspective view illustrating one embodiment of the legs of a keyswitch assembly in an extended position.

Base 220 is constructed from a rigid material and is used to provide support for the operation of legs 240 and 250 and spring 230. Legs 240 and 250 are interleaved together without the use of a pivot point approximately central to the legs, for example, as illustrated by FIG. 3A. In one embodiment, leg 240 is configured as a T-shaped member and leg 250 may be configured as an O-shaped member having a hole at its center. With such configurations legs 240 and 250 may be referred to as an inner leg and outer leg, respectively. When the T-shape of leg 240 and the O-shape of leg 250 are connected, the center portion of the T-shaped member is received in the center hole of the O-shaped member. As such, leg 240 has an inner portion surrounded by outer portions of leg 250.

When keyswitch 200 moves to the up position, spring 230 recoils and pushes up on a lip member 245 of inner leg 240, thereby forcing inner leg 240 up. The lip member 245 slides underneath outer leg 250 when in the up position. Because the center portion of inner leg 240 is underneath outer leg 250, outer leg 250 is also pushed up inner leg 240 when spring 230 recoils. The raising of legs 240 and 250, in turn, raises cap 260.

Figure 3B:
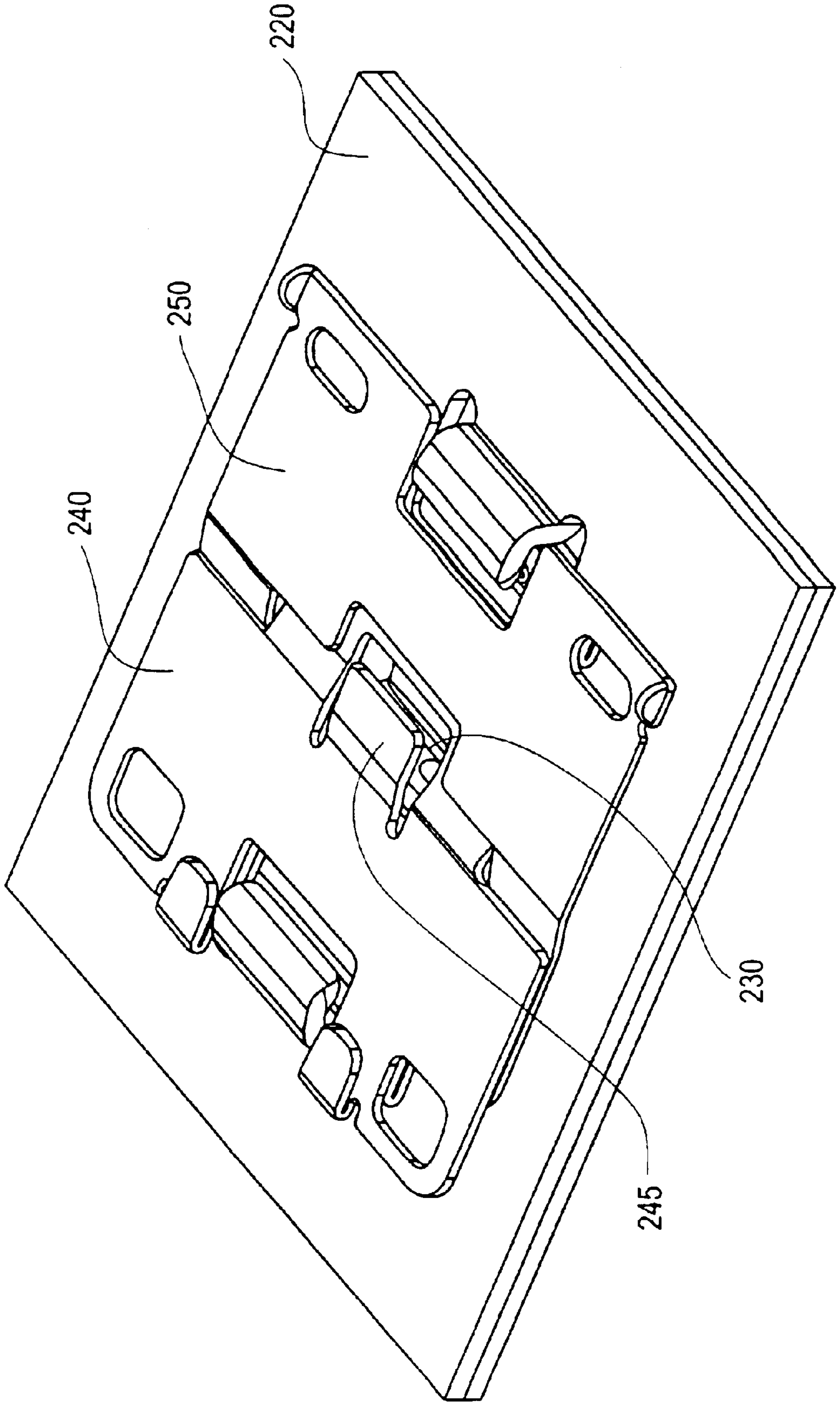
FIG. 3B is a perspective view illustrating one embodiment of the legs of a keyswitch assembly in a depressed position.

When a user presses keyswitch 200 into its down position, spring 230 buckles and legs 240 and 250 pivot until they lay flat in approximately a common plane as illustrated by FIG. 3B. The action of spring 230 and pivoting of legs 240, 250 are discussed further below.

The leg components may be referred to in the art using various terms, such as levers, plates, frames, links, etc. Regardless of the particular term used, the legs are components that, when interleaved together in the desired manner, form a scissors-like arrangement without the use of a pivot point approximately central to the legs. In one embodiment, cap 260, base 220 and legs 240, 250 are constructed from a rigid metal material. In alternative embodiments, any or all of cap 260, base 220 and legs 240 and 250 may be constructed from other rigid materials, for example, plastic.

Retaining clips 222 and 224 form a gap to receive ends 241 and 251 of legs 240 and 250, respectively. The gap allows for hinge action of ends 241 and 251 to rotate about their point of contact with base plate 220. The size of the gap between clips 222, 224 and base plate 220 is a factor that determines the degree to which ends 241 and 251 of legs 240 and 250 may rotate and, thus, the height 270 of keyswitch 200 in the up position. Ends 241 and 251 of legs 240 and 250, respectively, may be coupled to base plate 220 by various means, as discussed below in relation to FIGS. 7A and 7B.

The other ends 249 and 259 of legs 240 and 250, respectively, are coupled to cap 260. End 249 is coupled to cap 260 within a cavity 265 formed by clip 261. End 259 of leg 259 is coupled to cap 260 within a cavity 262 formed by retaining clip 266. Clips 261 and 262 may be constructed integrally with cap 260 or, alternatively, fabricated separately and attached to cap 260.

Figure 3C:
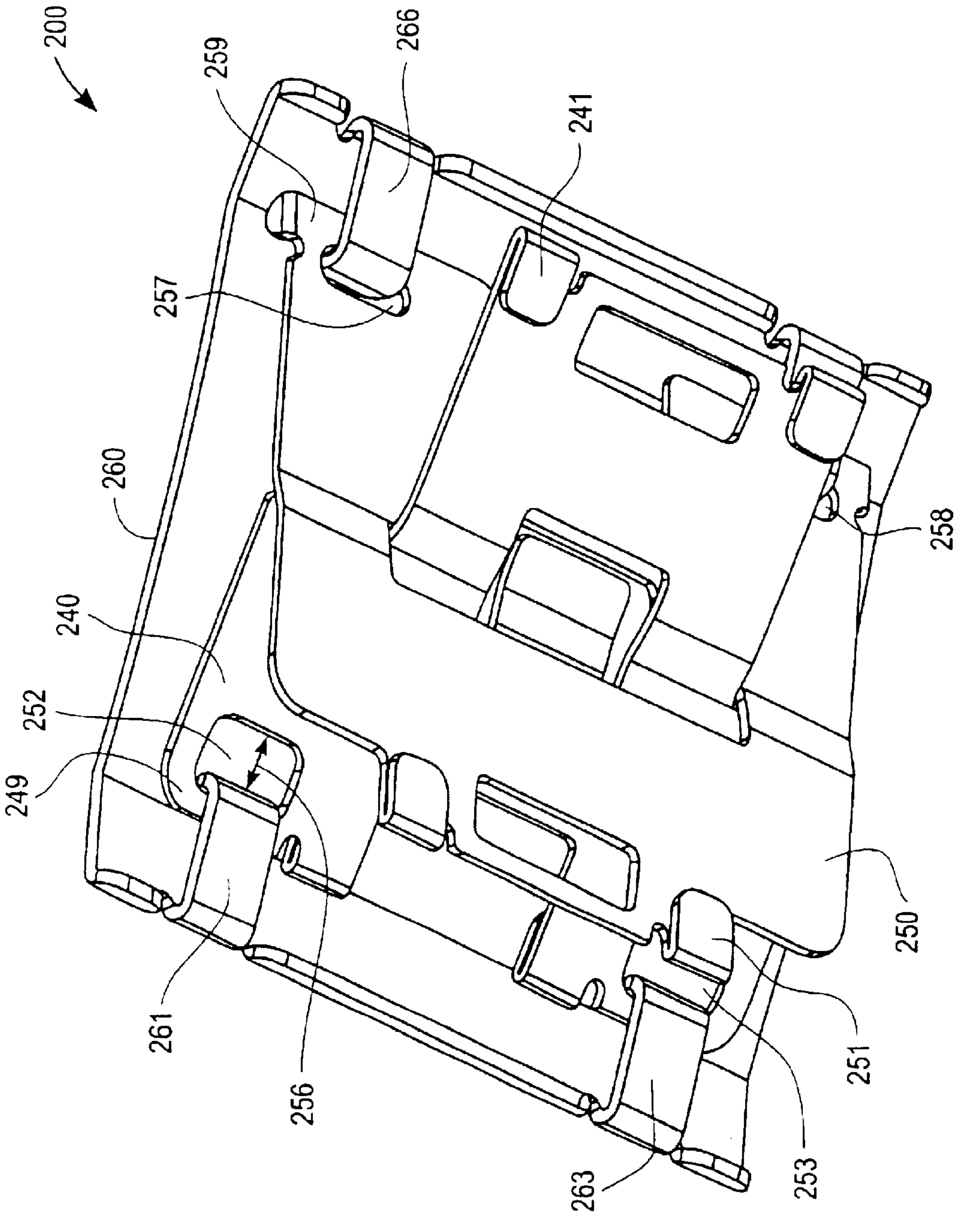
FIG. 3C is a bottom perspective view illustrating one embodiment of a portion of a keyswitch assembly.

FIG. 3C is a bottom perspective view of keyswitch 200 illustrating the undersides of legs 240, 250 and cap 260. End 259 has holes 257 and 258 on each side of leg 250 in which clips 261 and a similar clip on the other side of leg 250 (not shown) may be inserted. The cavities (e.g., cavity 262) formed by the clips (e.g., clip 261) and cap 260 allows for rotation of end 259 of leg 250 as keyswitch 200 expands to its up position.

End 249 has holes 252 and 253 on each side of leg 240 in which clips 261 and 263, respectively, may be inserted. The length 256 of holes 252 and 253 is sized to allow movement of clips 261 and 263, respectively, in a lateral direction as cap 260 is depressed towards base plate 220 into the down position illustrated by FIG. 2B. This allows legs 240, 250 to fold down while cap 260 is maintained approximately parallel with the plane of base plate 220. Moreover, the keycap remains level, or substantially parallel to the base throughout travel, no matter what area of cap 260 is pressed (e.g. even if cap 260 is pressed off-center). In one embodiment, keyswitch 200 may have a height 270 of approximately 5.5 mm in its up position of FIG. 2A and may be compressed to a height 275 of approximately 2.5 mm in its down position of FIG. 2B.

Although keyswitch 200 is illustrated with outer leg 250 constrained at end 259, in an alternative embodiment, inner leg 240 may be constrained at end 249 with the end of leg 250 having freedom of movement in a lateral direction.

Figure 3D:
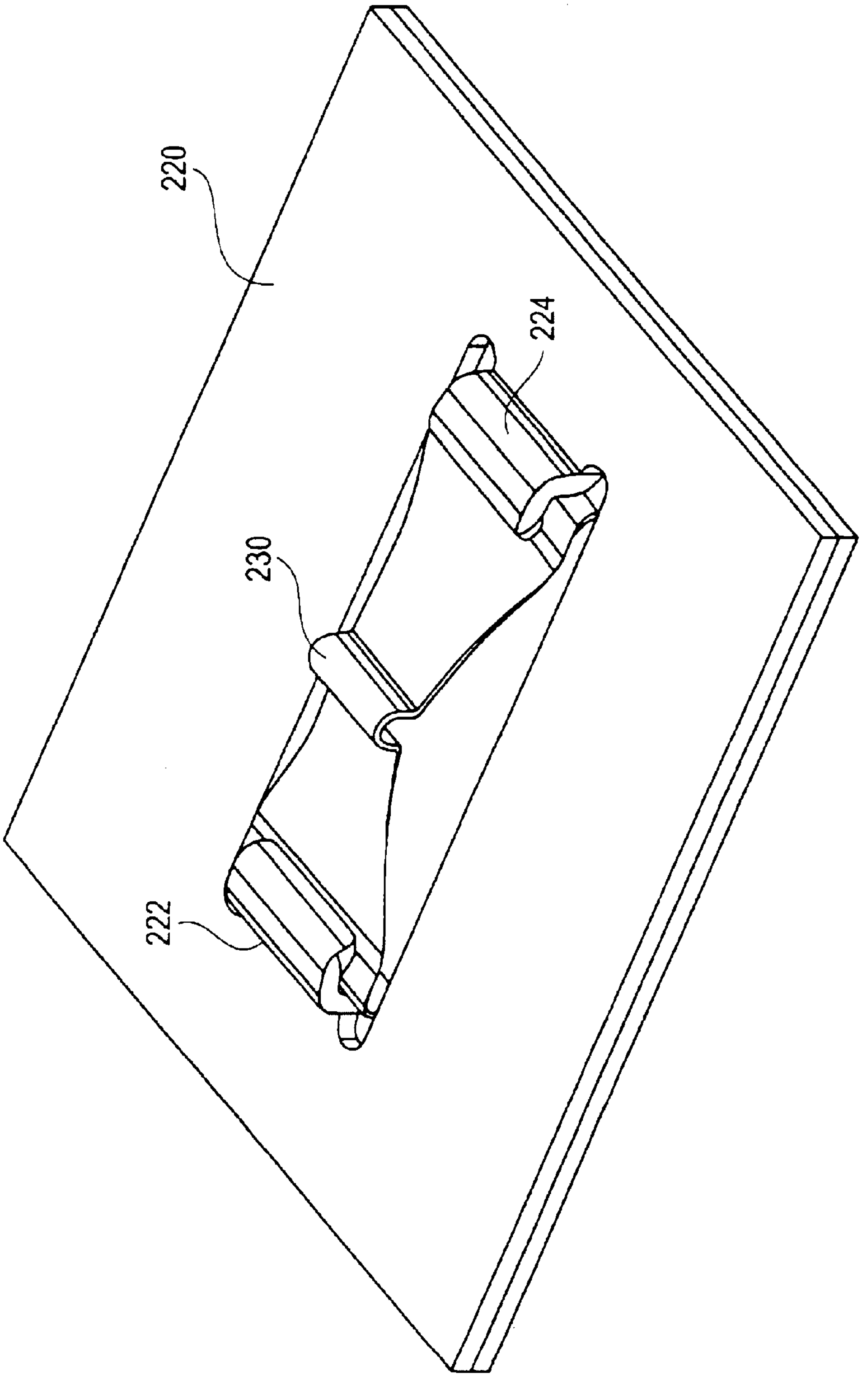
FIG. 3D is a perspective view illustrating one embodiment of a spring in r elation to a base plate.

Spring 230 is coupled between base plate 220 and legs 240, 250. Retaining clips 222 and 224 may be used to secure spring 230 to the base plate, as illustrated by FIG. 3D. Spring 230 generates force to expand keyswitch 220 to its up position when it is not constrained by depression of the keyswitch. The function of spring 230 is to provide an over-center "buckling" to create tactile feedback that signals the user that the key has been depressed sufficiently.

Spring 230 is constructed from a flexible material that is formed into a shape. The shape is deformed by application of a force to depress keyswitch 200. When the force is removed from application, spring 230 recoils to its original shape, thereby returning keyswitch 200 to its up position of FIG. 2A. The operation of spring is known in the art; accordingly, a detailed discussion is not provided herein. The spring may have various designs to achieve this function, as illustrated by FIGS. 4–6.

Figure 4A:
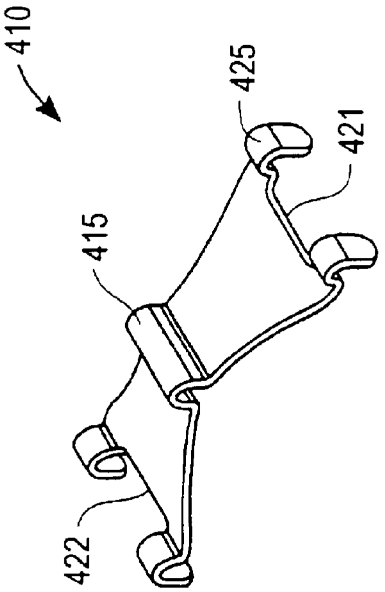
FIGS. 4A–4C are different perspective views that illustrate one embodiment of a spring.
Figure 4B:
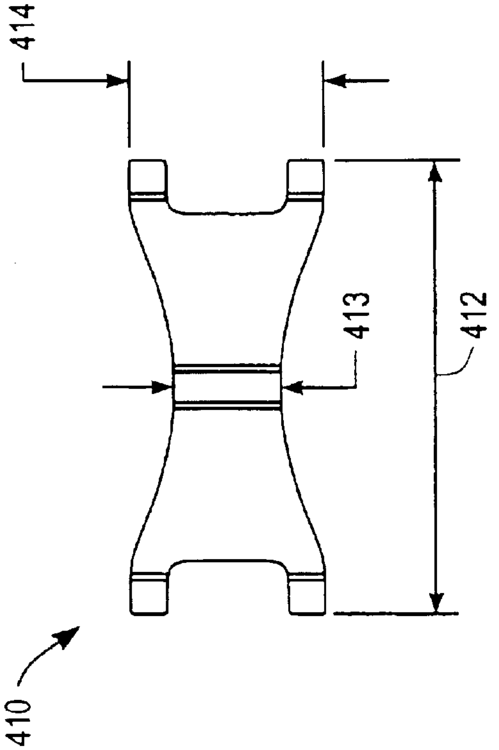
Figure 4C:
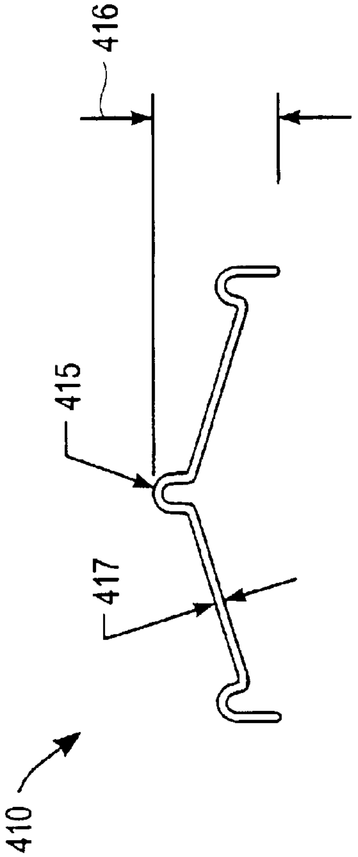

FIGS. 4A–4C are different perspective views that illustrates one embodiment of a spring. FIG. 4A is a three dimensional view of spring 410, while FIG. 4B and FIG. 4C show a planer top view and a cross-section, respectively, of spring 410. Spring 410 includes a raised center hump 415 and ends 421 and 422 having hooks 425. The hooks 425 may be coupled to corresponding slots in the base plate of a keyswitch and disposed under retaining clips of the base plate. The sides of spring 410 may be curved to have a width 413 approximate its center that is less than the width 414 at its ends 421, 422, as illustrated by FIG. 4B.

In one embodiment, spring 410 may have a center width 413 of 3 mm; a length 412 of approximately 13 mm; a width 414 at its ends of approximately 5 mm; a height 416 of approximately 3 mm; and a thickness 417 of approximately 0.1 mm. In one embodiment, center hump 415 has radius of approximately 0.5 mm. In alternative embodiments, spring 410 may have other dimensions.

Figure 5A:
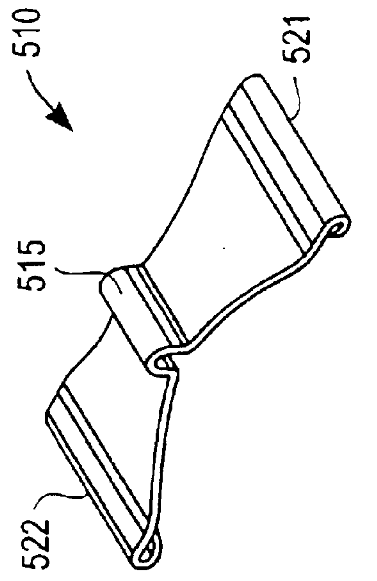
FIGS. 5A–5C are different perspective views that illustrate an alternative embodiment of a spring.
Figure 5B:
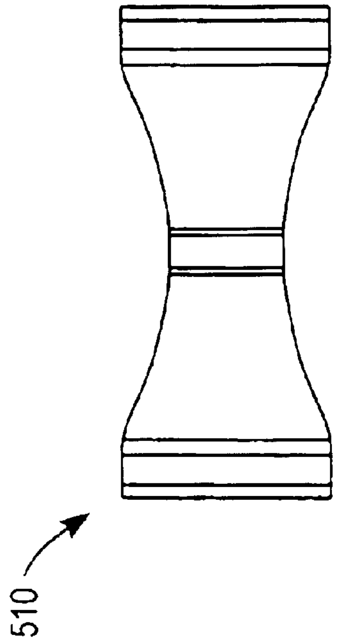
Figure 5C:
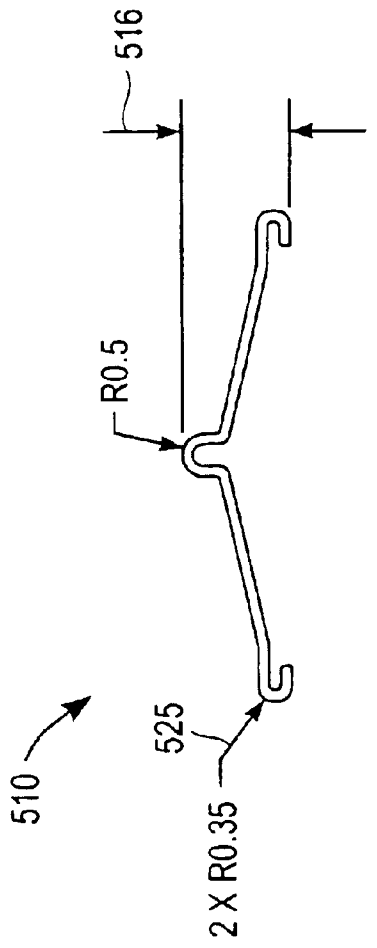

FIGS. 5A–5C are different perspective views that illustrates an alternative embodiment of a spring. FIG. 5A is a three dimensional view of spring 510, while FIG. 5B and FIG. 5C show a planer top view and a cross-section, respectively, of spring 510. Spring 510 includes a raised center hump 515 and ends 521 and 522 having hooks 525 that loop underneath the body of spring 510. The hooks 525 may be disposed under retaining clips of a base plate. The dimensions of spring 510 may be similar to those of spring 410 of FIGS. 4A–4C.

Figure 6A:
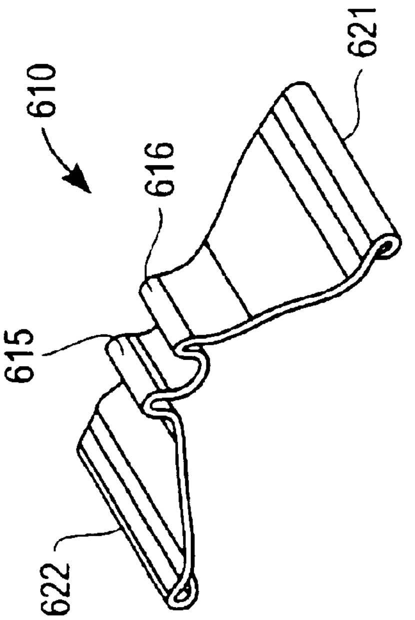
FIGS. 6A–6C are different perspective views that illustrate yet another embodiment of a spring.
Figure 6B:
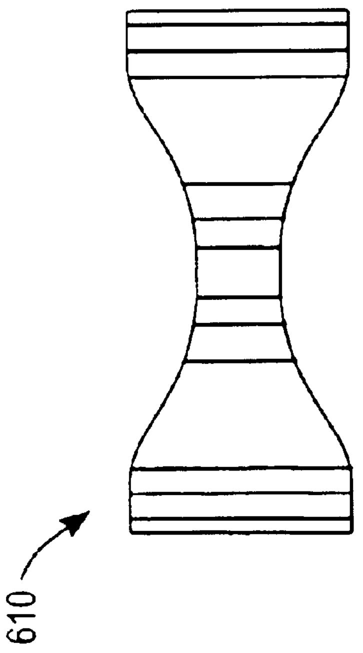
Figure 6C:
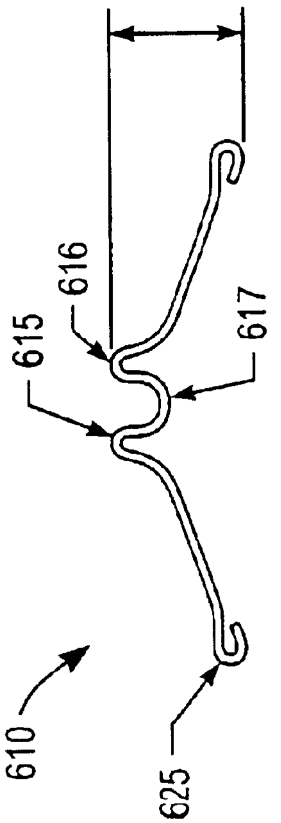

FIGS. 6A–6C are different perspective views that illustrates yet another embodiment of a spring. FIG. 6A is a three dimensional view of spring 610, while FIG. 6B and FIG. 6C show a planer top view and a cross-section, respectively, of spring 610. Spring 610 includes two raised center humps 615 and 616 and ends 621 and 622 having hooks 625 that loop underneath the body of spring 610. As previously discussed, the hooks 625 may be disposed under retaining clips of a base plate.

In one embodiment, humps 615 and 616 may have a radius of approximately 0.35 with the valley 617 between the humps having a radius of approximately 0.75. The other dimensions of spring 610 may be similar to those of spring 410 of FIGS. 4A–4C.

The springs discussed herein may allow for more travel than a dome spring. Such springs have an over-center buckling action, unlike a cantilevered spring. In addition, the springs discussed herein do not need to be glued down as may be required with other types of springs. The springs discussed herein (e.g., spring 610) may also be made of a metal or metallic alloy material, for example stainless steel. Such a metal spring has many benefits over silicon rubber dome springs. For examples, a metal spring may be more durable, have a longer life, and may be more resistant to chemicals and temperature changes. A metal spring may also be more accurately assembled by machine.

Figure 7:
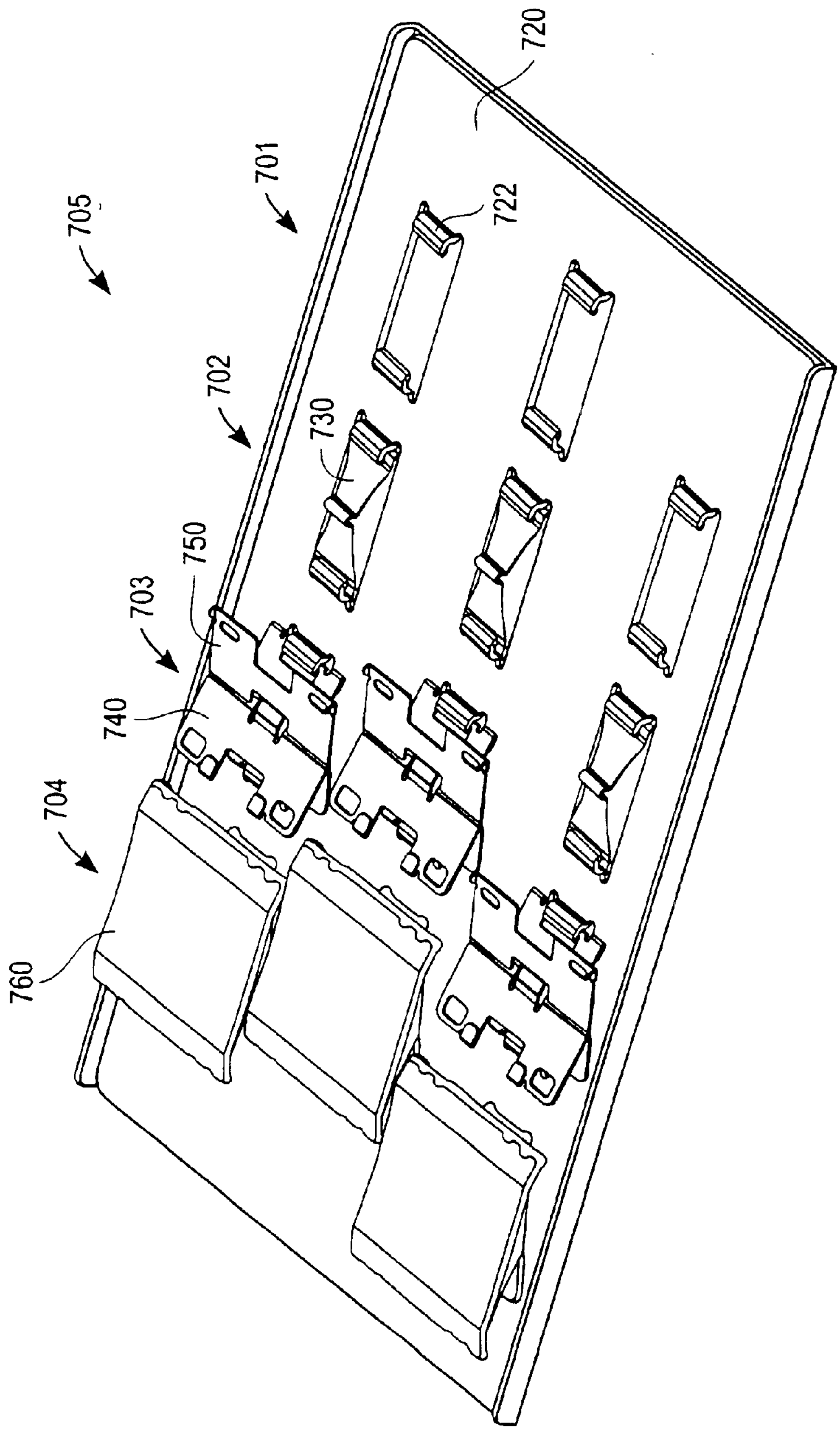
FIG. 7 is a perspective view illustrating one embodiment of stages of a keyswitch assembly starting from a first column of a base plate with retaining clips to a fourth column having a key cap coupled to legs.

FIG. 7 is a perspective view illustrating one embodiment of stages of a keyswitch assembly. The keyswitch may be designed as described above in relation to FIGS. 2A–6C.

Each column 701–704 of the assembly 705 shows the keyswitches at a different stage of assembly. The first column 701 shows base plate 720 with just the retaining clips (e.g., clip 722). As previously discussed, the retaining clips may be integrally formed with the base plate or separately connected to the base plate.

The second column 702 shows the springs (e.g., spring 730) coupled to base plate 720. The ends of the springs may be inserted underneath the retaining clips of base plate 720. The third column 703 shows the legs 740, 750 coupled to base plate 720. The ends of legs 740 and 750 may be inserted underneath the retaining clips of base plate 720. The fourth column 704 shows the cap 760 coupled to legs 740, 750.

Figure 8A:
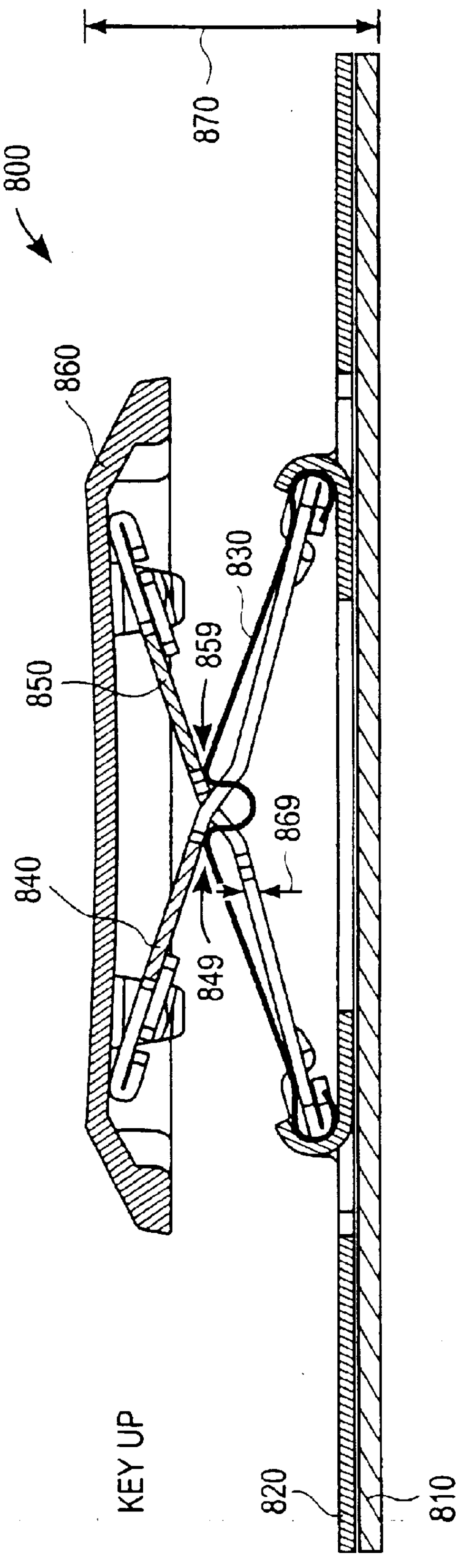
FIG. 8A is a cross-sectional view illustrating an alternative embodiment of a keyswitch assembly in an extended position.

FIG. 8A is a cross-sectional view illustrating an alternative embodiment of a keyswitch in an extended position. Keyswitch 800 is shown in the up position that it normally resides in when not being depressed either by a user or by the collapsing of a keyboard on which it is contained. In one embodiment, keyswitch assembly 800 includes a sheet member ("skin") 810, a base plate 820, a spring 830, legs 840 and 850, and cap 860.

A flex membrane (not shown) is disposed between base plate 820 and skin 810. When keyswitch 800 is depressed into its down position, illustrated in FIG. 8B, an electrically conductive puck attached to the key, for example, shorts the contacts to complete an electrical circuit. The flex membrane may be similar to that discussed above in relation to FIG. 2A.

Figure 8B:
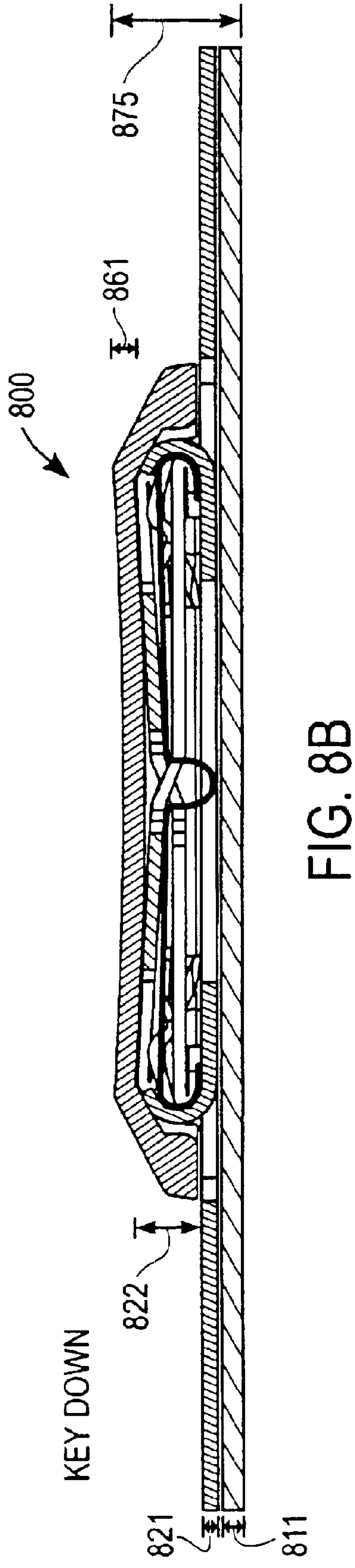
FIG. 8B is a cross-sectional view illustrating an alternative embodiment of a keyswitch assembly in a depressed position.

When keyswitch 800 moves to the up position, spring 830 recoils and contacts legs 840 and 850 at points 849 and 859, respectively, which simultaneously pushes up on both legs 840 and 850. The raising of legs 840 and 850, in turn, raises cap 860. When a user presses keyswitch 800 towards its down position, spring 830 buckles and legs 840 and 850 pivot about their point of contact with base 820. Legs 840 and 850 are undulated approximately at their centers to allow the legs to lay flat in approximately a common plane as illustrated by FIG. 8B. The action of spring 830 and pivoting of legs 840, 850 are discussed further below. In one embodiment, for example, keyswitch 800 may have a height 870 of approximately 5 mm in its up position of FIG. 8A and may be compressed to a height 875 of approximately 2.5 mm in its down position of FIG. 8B. As such the height 875 of the keyswitch, as illustrated in FIG. 8B, is equal to the thickness 821 of base 820 plus the height 822 of a leg, 840 or 850, plus the thickness 861 of cap 860. In one embodiment, height 822 of a leg may be less than 1 millimeter. In one embodiment, leg 840 may have a constant thickness 862 of approximately 0.25 mm. In alternative embodiments, other heights and thickness may be used.

Base 820 is constructed from a rigid material and is used to provide support for the operation of legs 840 and 850 and spring 830. Legs 840 and 850 are interleaved together without the use of a pivot point approximately central to the legs, for example, as illustrated by FIG. 9A.

Figure 9A:
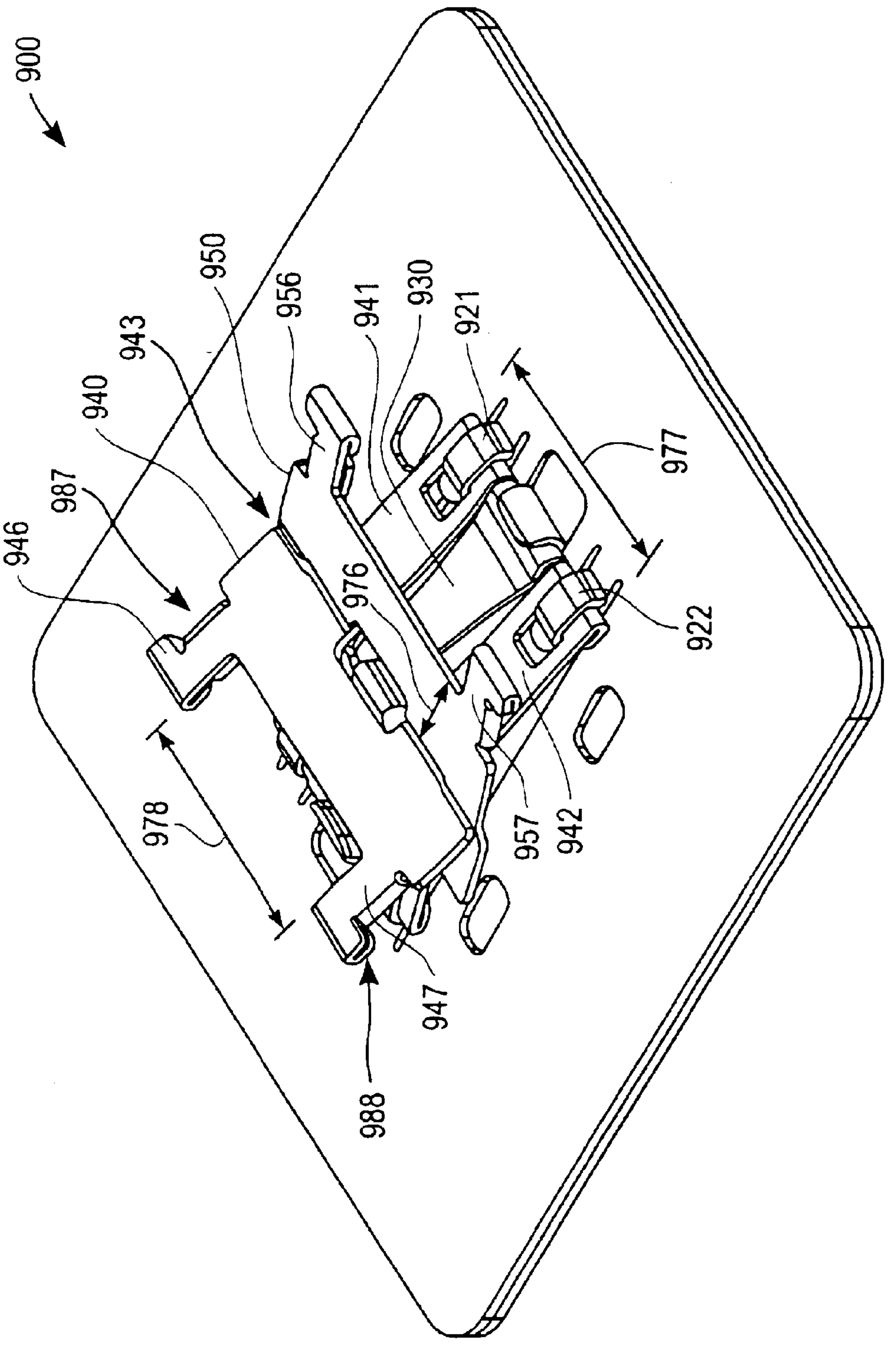
FIG. 9A is a perspective view illustrating an alternative embodiment of the legs of a keyswitch assembly in an extended position.

FIG. 9A is a perspective view illustrating an alternative embodiment of the legs of a keyswitch in an extended position. Leg 940 may have two lower protrusions 941, 942 extending from approximately its midpoint 943 towards base 920. Leg 950 may also have two lower protrusions 951, 952 extending from approximately its midpoint 953 towards base 920, as illustrated in FIG. 9C. The lower protrusions 941, 942 are disposed within the space formed by lower protrusions 951, 952 of leg 950. With such a configuration, legs 940 and 950 may be referred to as an inner leg and outer leg, respectively.

Retaining clips 921 and 922 each form a gap to receive the ends of lower protrusions 941 and 942, respectively, of leg 940. Similar retaining clips (not shown) are positioned to receive the ends of lower protrusions 952 and 952 of leg 950. The gaps of the retaining clips allow for hinge action of the ends of the lower protrusions to rotate about their point of contact with base plate 920.

In one embodiment, the length of travel of the spring 930 determines the degree to which the ends of legs 940, 950 may rotate and, thus, the height 870 of FIG. 8 of the keyswitch in the up position. In another embodiment, the size of the gap between the retaining clips and base plate is a factor that determines the degree to which the ends of legs 940, 950 may rotate and, thus, the height 870 of FIG. 8 of the keyswitch in the up position. The ends of lower protrusions 941 and 942 of leg 940 may be coupled to base plate 920 by various means, as discussed above in relation to FIGS. 7A and 7B.

Referring still to FIG. 9A, leg 940 may have two upper protrusions 946, 947 extending from approximately its midpoint 943 towards the cap (not shown). Leg 950 may also have two upper protrusions 956, 957 extending from approximately its midpoint 953 towards the cap (not shown). Each of the upper protrusions (e.g., upper protrusion 946) has a slot (e.g., slot 987) to receive a tab from the cap as discussed below in relation to FIG. 9C.

Figure 9B:
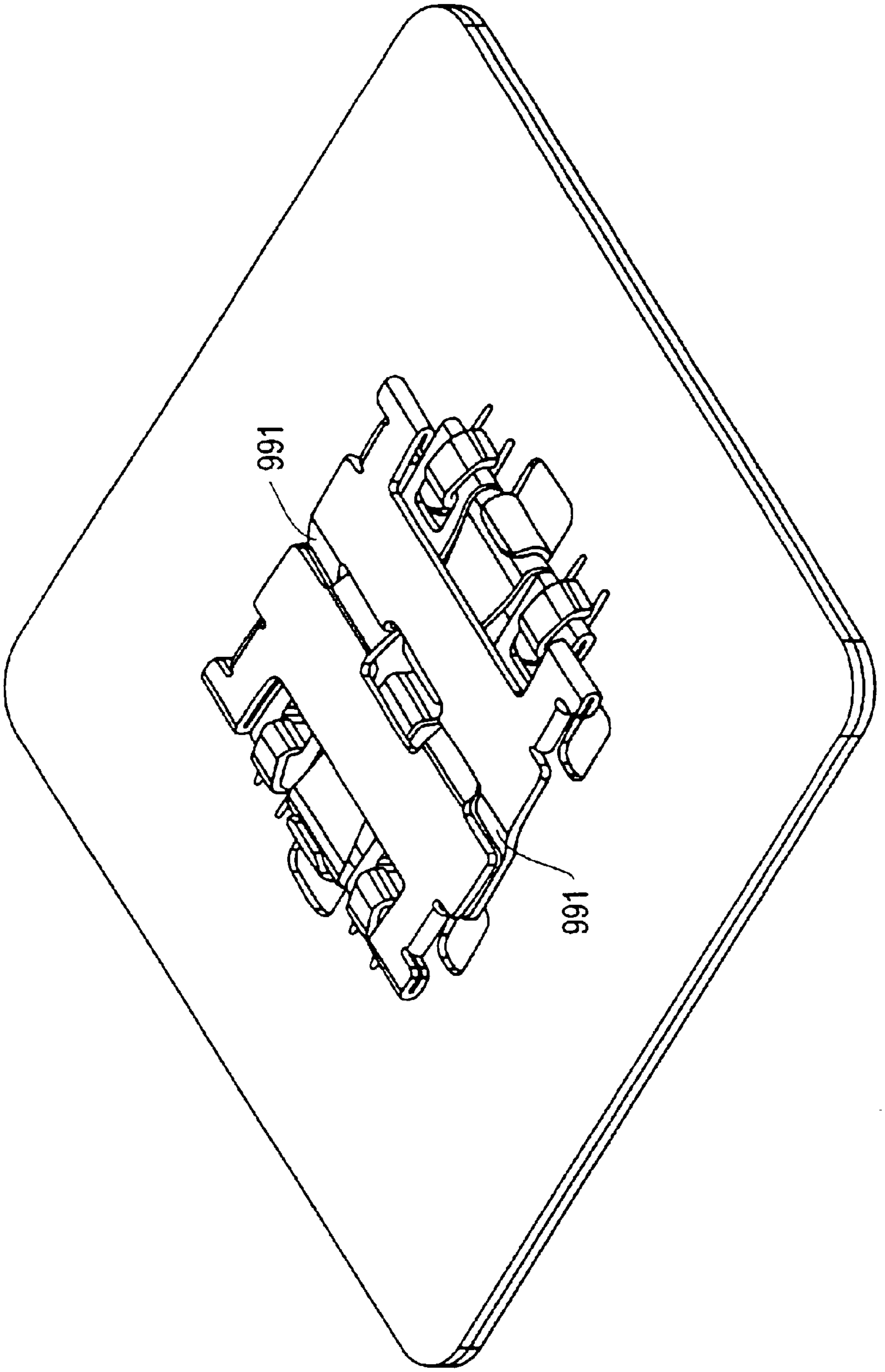
FIG. 9B is a perspective view illustrating an alternative embodiment of the legs of a keyswitch assembly in a depressed position.
Figure 9C:
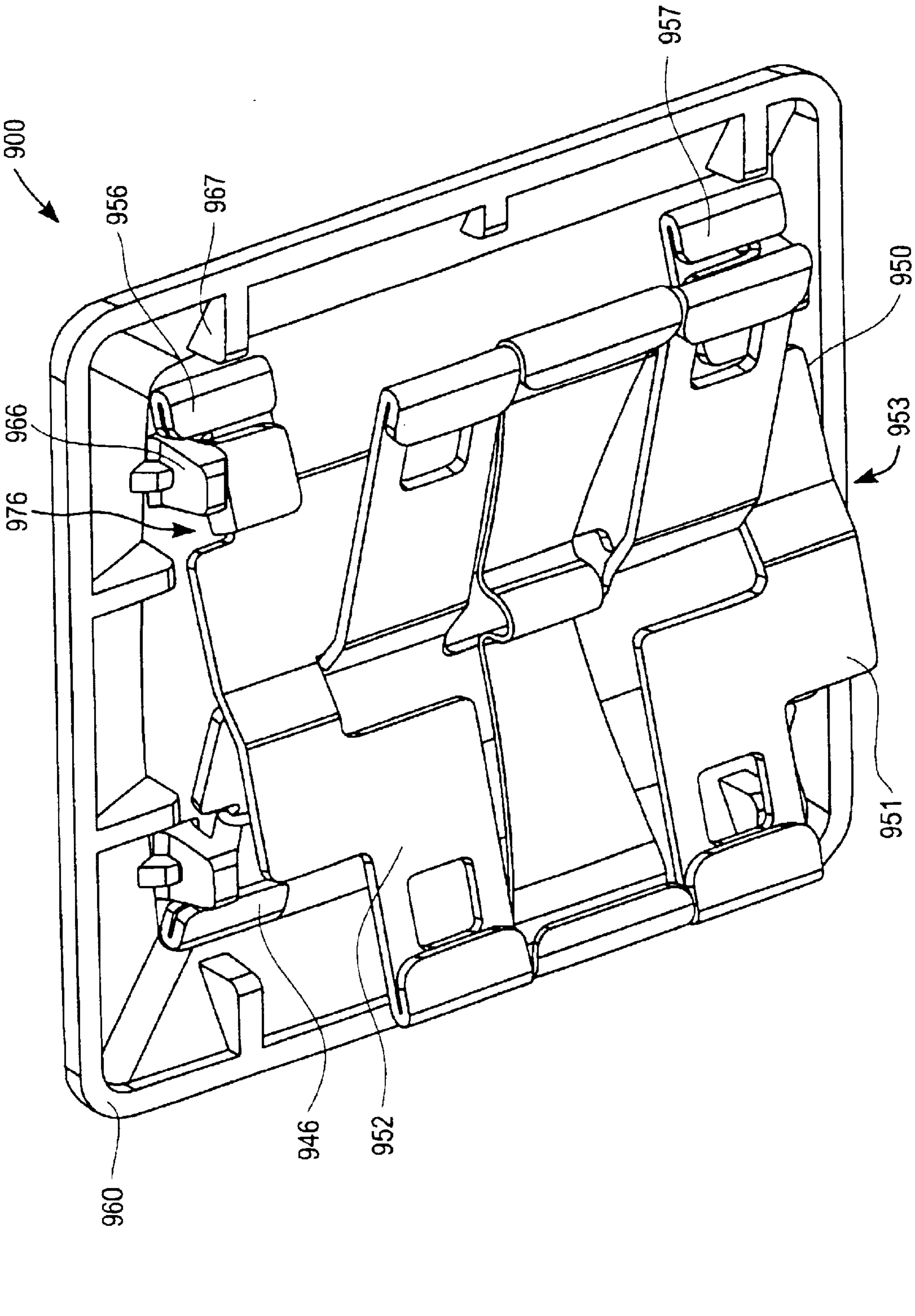
FIG. 9C is a bottom perspective view illustrating an alternative embodiment of a portion of a keyswitch assembly.

In one embodiment, the width 978 of the space between upper protrusions 947 and 946 is selected to at least a wide as the distance 977 between the outside edges of clips retaining the lower protrusions of leg 950 (with corresponding dimensions of the components on the other side of keyswitch 900) to allow legs 940 and 950 to lay flush against each other in the depressed position illustrated in FIG. 9B. In one embodiment, the length 976 of the upper portion of leg 950 is selected to be short enough to avoid contact with retaining clips 921 and 922 (with corresponding dimensions of the components on the other side of keyswitch 900) to similarly allow legs 940 and 950 to lay flush against each other in the depressed position illustrated in FIG. 9B. As previously mentioned, legs 940 and 950 may be undulated approximately at their centers (e.g., areas 991).

FIG. 9C is a bottom perspective view of keyswitch 900 illustrating the undersides of legs 940, 950 and cap 960 components. The interaction of the upper protrusion 956 with cap 960 is discussed below. It should be noted that the other upper protrusions 946, 947, and 957 interact with cap 960 in a similar manner.

The bottom surface of cap 960 includes tab 966 and stop 967. Tab 966 may be pivotally coupled to protrusion 956 in slot 976 with corresponding tabs pivotally coupled to the other upper protrusions in their respective slots. The tabs translate with the movement of the keyswitch. The length of the slots (e.g., slot 976) is sized to allow movement of the tabs (e.g., tab 966) in a lateral direction as cap 960 is depressed towards the base (not shown) into the down position illustrated by FIG. 8B. This allows legs 940, 950 to fold down while cap 960 is maintained approximately parallel with the plane of the base plate. Stop 967 may operate as a stop for tab 966 as tab 966 slides within slot 976 as keyswitch 900 is depressed. The tabs and stops may be integrally formed with the cap or separately connected to the cap.

Figure 9D:
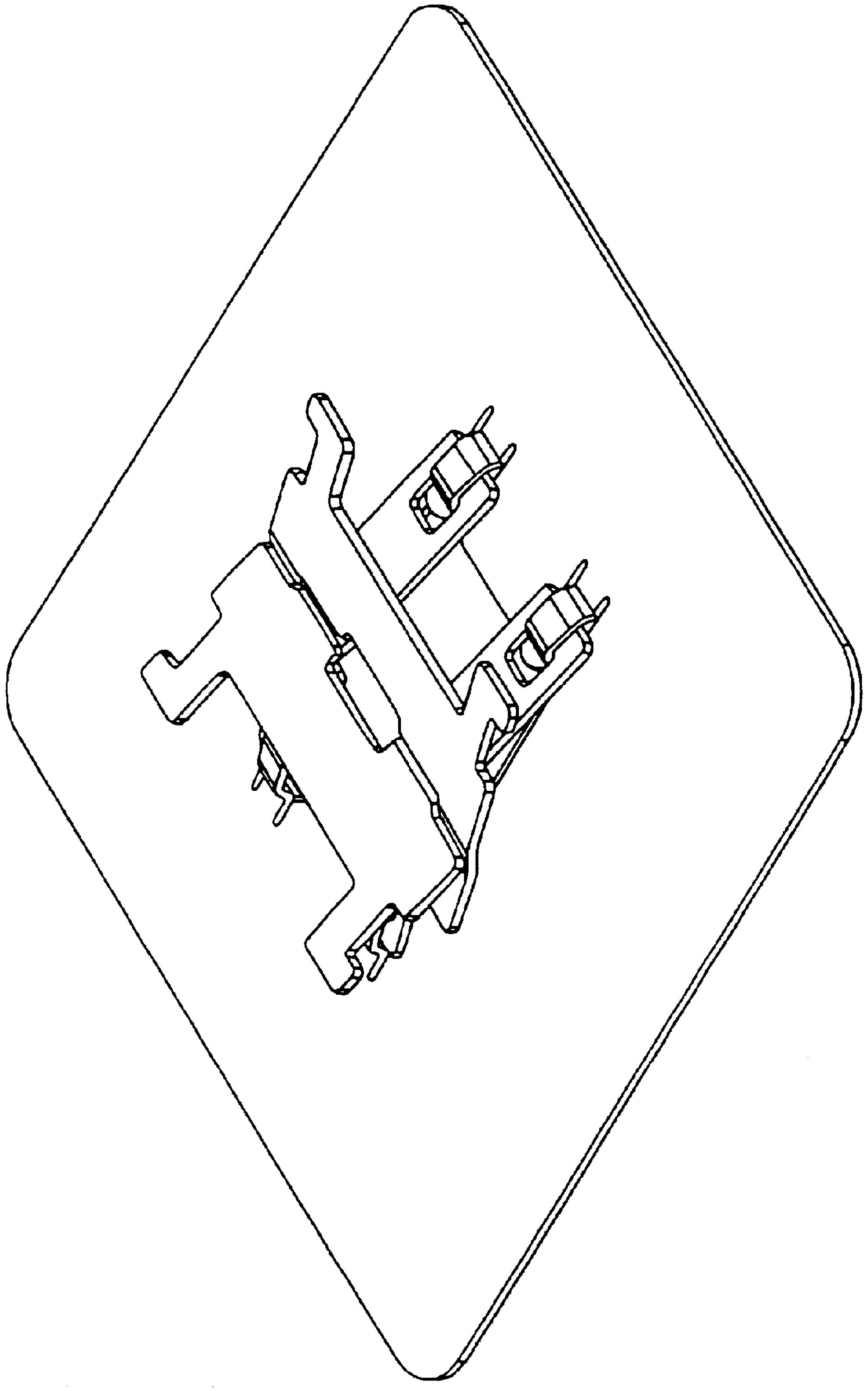
FIG. 9D illustrates an embodiment of a keyswitch having legs without hems.

In one embodiment, the protrusions of the legs may have a piece of material folded over its surface that may be referred to as a hem (e.g., hem 988). In alternative embodiments, the legs of the keyswitches discussed herein may not have hems, as illustrated in FIG. 9D.

Figure 10A:
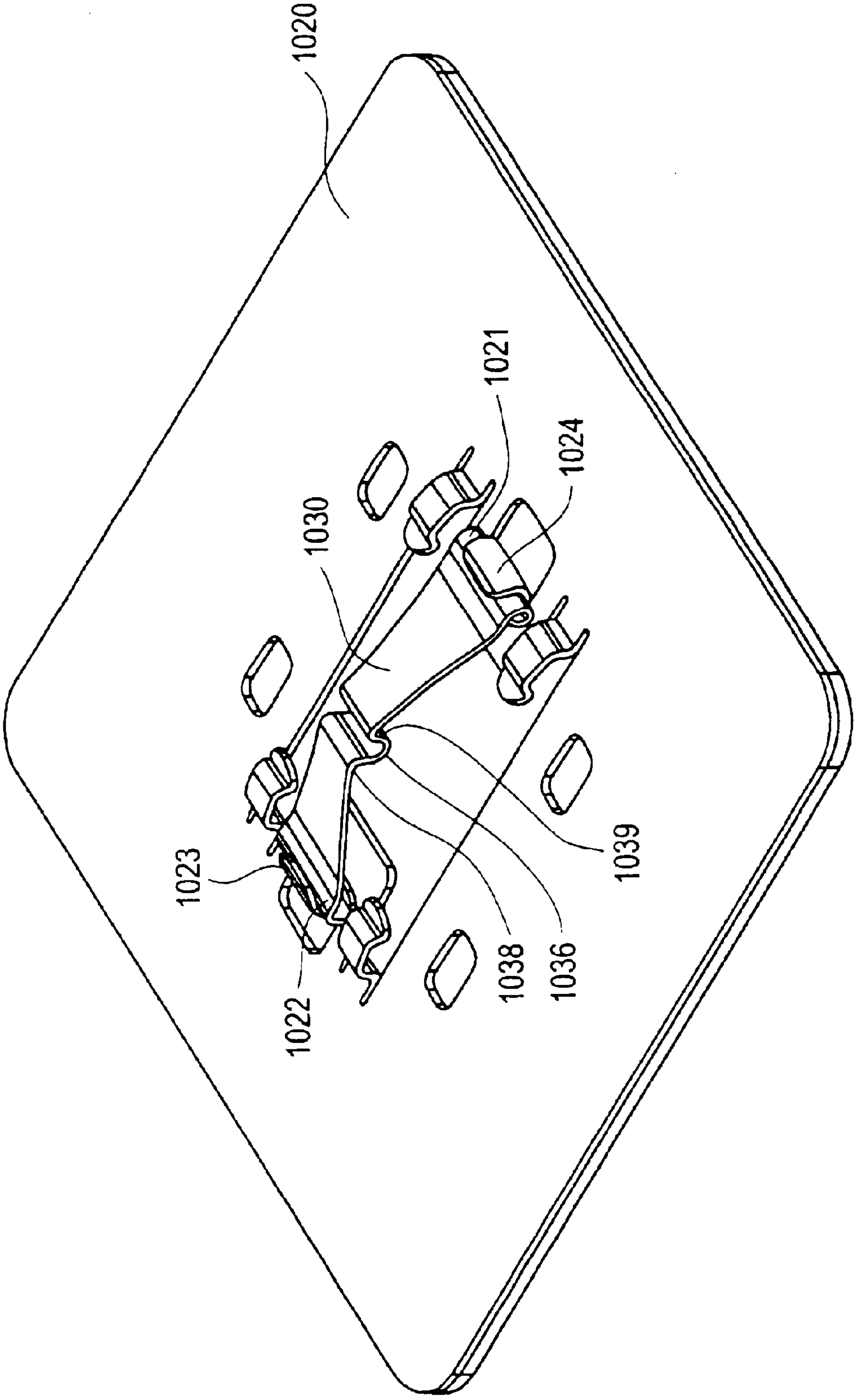
FIG. 10A is a perspective view illustrating an alternative embodiment of a spring in relation to a base plate.

FIG. 10A is a perspective view illustrating one embodiment of a spring in relation to a base plate. In one embodiment, spring 1030 may have a unitary body constructed of a thin material that is generally bowed along its length. Spring 1030 has ends 1021 and 1022 and a downward extending bump 1036 at its center. In one embodiment, the ends 1021 and 1022 may be curled underneath the body of spring 1030.

Spring 1030 may be coupled to base plate 1020. Retaining clips 1023 and 1024 may be used to secure spring 1030 to the base plate. Spring 1030 generates force to expand the keyswitch to its up position when it is not constrained by depression of the keyswitch. The function of spring 1030 is to provide an over-center "buckling" to create tactile feedback that signals the user that the key has been depressed sufficiently.

Figure 10B:
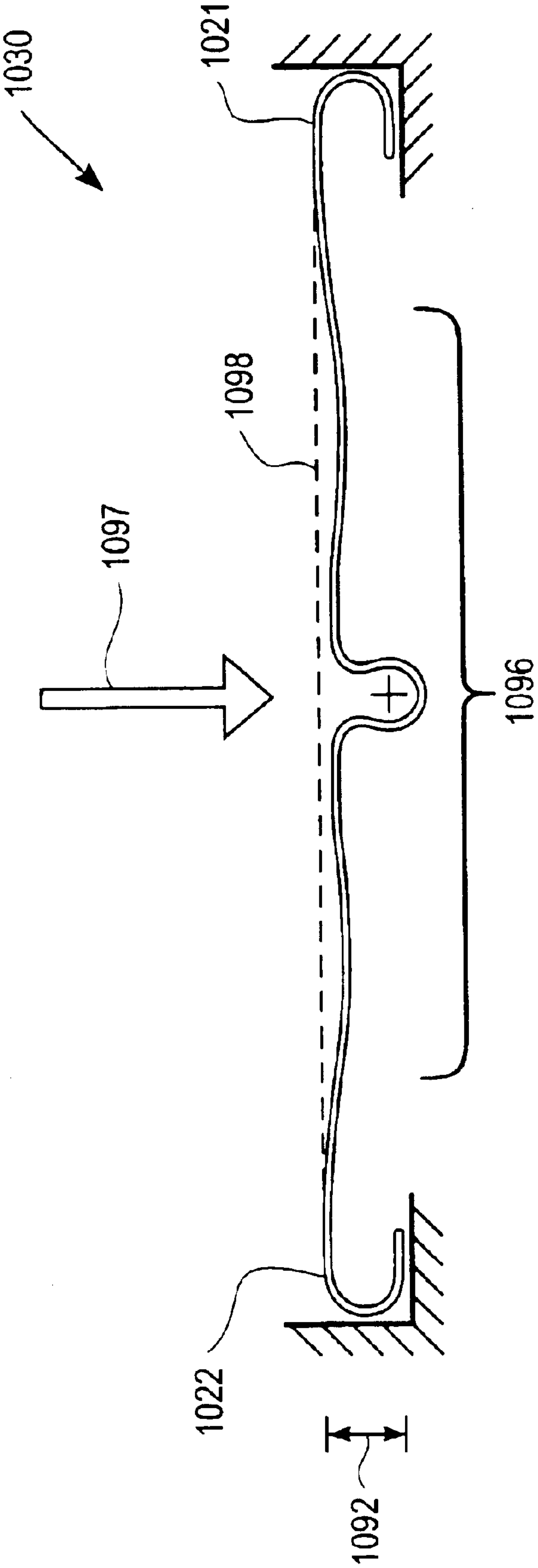
FIG. 10B illustrates one embodiment of spring buckling.

In order for spring 1030 to provide this tactile feedback, the ends 1021 and 1022 of spring 1030 are constrained vertically and horizontally, while still being allowed to rotate. The curling of ends 1021 and 1022 may facilitate their rotation. By constraining ends 1021 and 1022, spring 1030 is forced to buckle as the center point 1096 passes below the horizontal plane 1098 created by the ends of the spring, as illustrated in FIG. 10B. At this position, the actuation force 1097 drops, giving an indication that the switch has been pressed far enough for contact to be made. Spring 1030 bottoms out against the ground plane (not shown) preventing spring 1030 from going completely over-center and allowing spring 1030 to return to its original bowed upwards configuration. In one embodiment, for example, spring 1030 has a height 1092 of approximately 1 millimeter in the collapsed position, thereby providing a tactile feedback with a deflection on the order of approximately 1.5 mm.

As spring 1030 is compressed, bump 1036 collapses, effectively shortening the length of spring 1030. This makes it possible to achieve greater vertical travel from spring 1030. Bump 1036 also adds lateral compliance to spring 1030. Bump 1036 may provide more uniform spring buckling, while requiring using less actuation force 1097, than a spring without bump 1036. The reduction in actuation force, necessary to buckle spring 1030, results from the greater lateral compliance due to bump 1036. In addition, the actuation force 1097 may be tuned by changing the material thickness of spring 1030. In one embodiment, for example, to achieve a 50 gram actuation force, the thickness of spring 1030 may be on the order of approximately 0.075 mm. As such, bump 1036 may provide for greater stability and uniformity in buckling, while providing longer actuation travel using a lower actuation force.

In one embodiment where spring 1030 is made from a material that can be formed into a resilient shape (e.g., spring steel or hardened stainless steel), spring 1030 may be maintained within the elastic limits of the material to allow it to remain in a collapsed position without significant degradation. In alternative embodiments, other materials and thickness may be used.

Spring 1030 includes two raised areas 1038 and 1039, formed by the bowing of the body and bump 1036 in the up position, that each provide contact with a leg, as discussed above in relation to FIG. 8A. Providing contact of the spring with both legs may allow for less rotational movement of the cap and, thus, more of a planar orientation in relation to the base, during keyswitch travel from an up position to a down position.

Figure 11A:
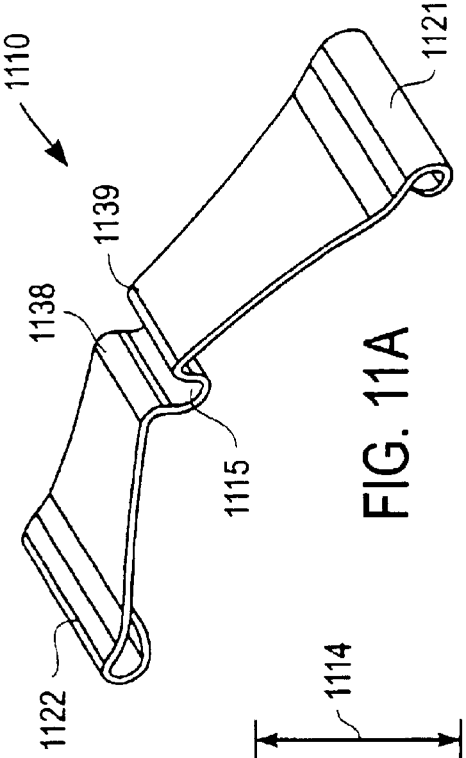
FIGS. 11A–11C are different perspective views that illustrate an alternative embodiment of a spring.
Figure 11B:
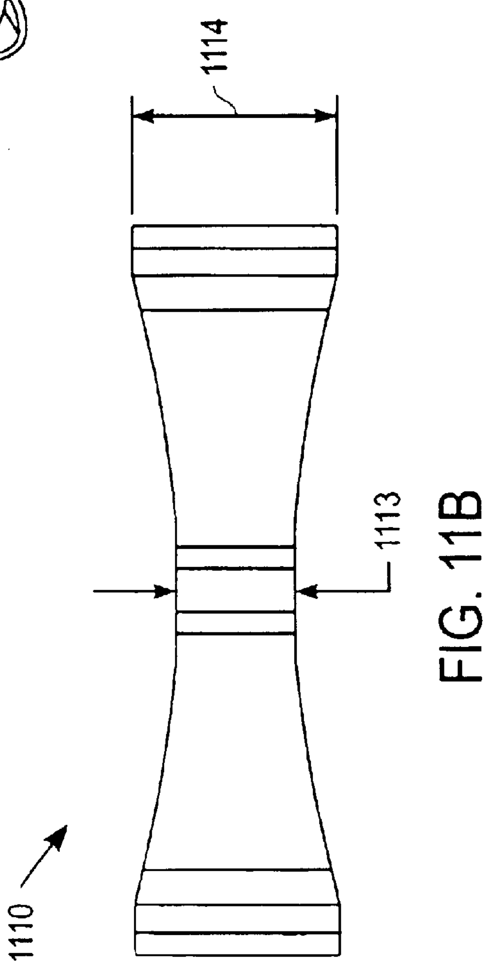
Figure 11C:
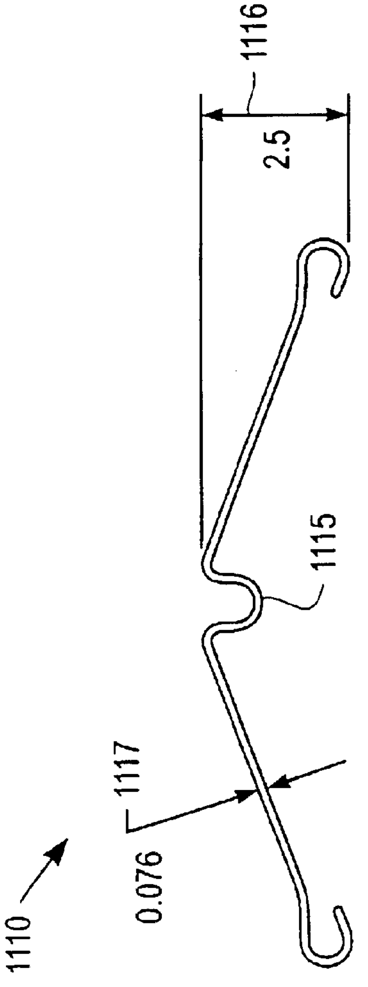

FIGS. 11A–11C are different perspective views that illustrates one embodiment of a spring. FIG. 11A is a three dimensional view of spring 1110, while FIG. 11B and FIG. 11C show a planer top view and a cross-section, respectively, of spring 1110. Spring 1110 includes two raised areas 1138 and 1139, a center bump 1115, and ends 1121 and 1122. The ends may be coupled to retaining clips of a base plate as illustrated in FIG. 10A. The sides of spring 1110 may be curved to have a thickness 1113 approximate its center that is less than the thickness 1114 at its ends 1121 and 1122, as illustrated in FIG. 11B. The curved sides create a narrow cross-section in the center that allows the bump 1115 to be more effective for buckling. The wider ends 1121 and 1122 may provide for more stability of spring 1110 in its operation.

In one embodiment, spring 1110 may have a center width 1113 of 2 mm; a width 1114 at its ends of approximately 3.5 mm; a height 1116 of approximately 2.5 mm; and a thickness 1117 of approximately 0.076 mm. In one embodiment, center bump 1115 has a radius of curvature of approximately 0.5 mm. In alternative embodiments, spring 1110 may have other dimensions.

Figure 12:
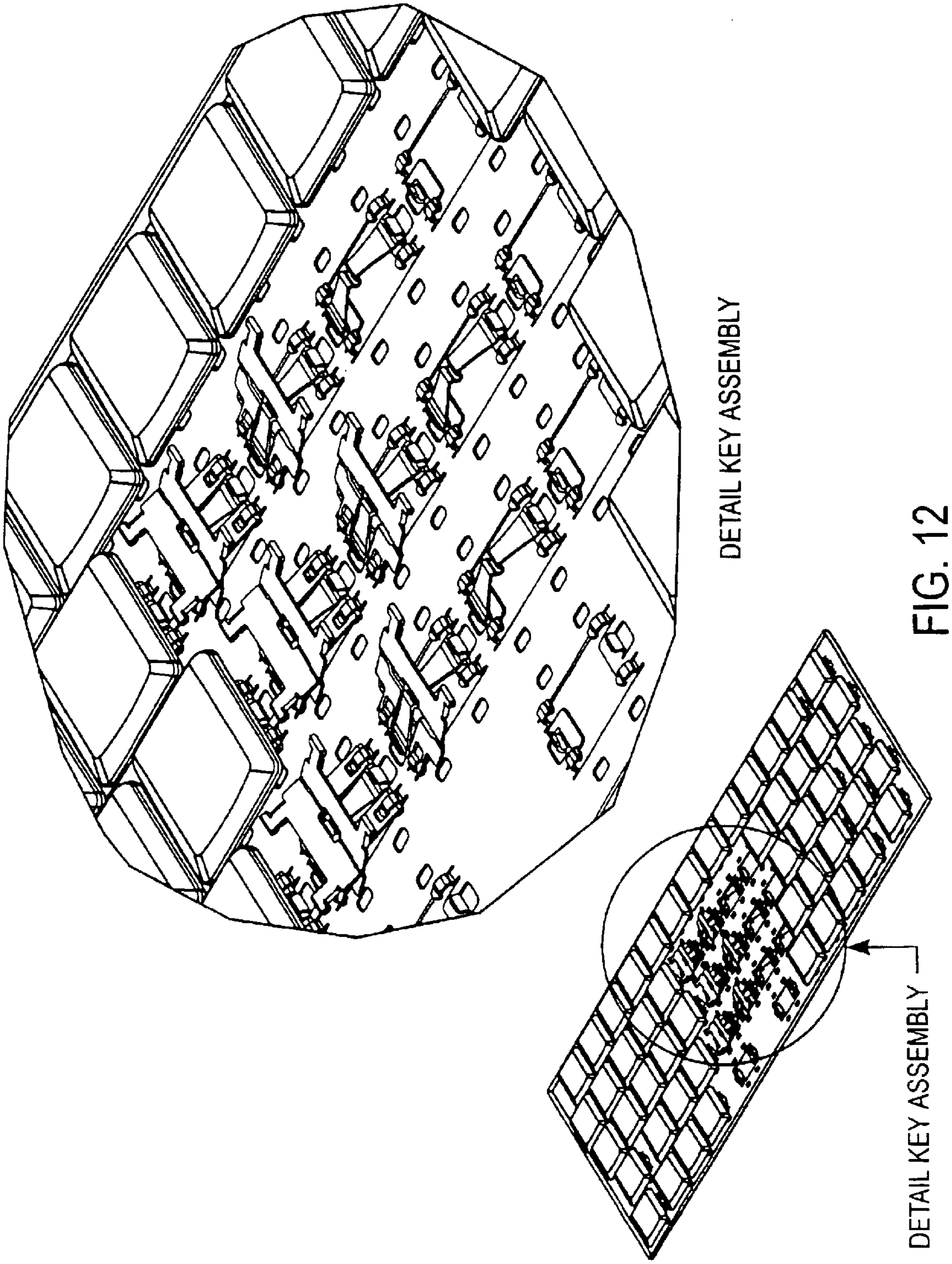
FIG. 12 is a perspective view illustrating another embodiment of stages of the assembly of keyswitches in a keyboard.

FIG. 12 is a perspective view illustrating another embodiment of stages of the assembly of keyswitches in a keyboard. The keyswitches may be designed as described above in relation to FIGS. 8A–11. The stages may be similar to that described above in relation to FIG. 7.

Figure 17A:
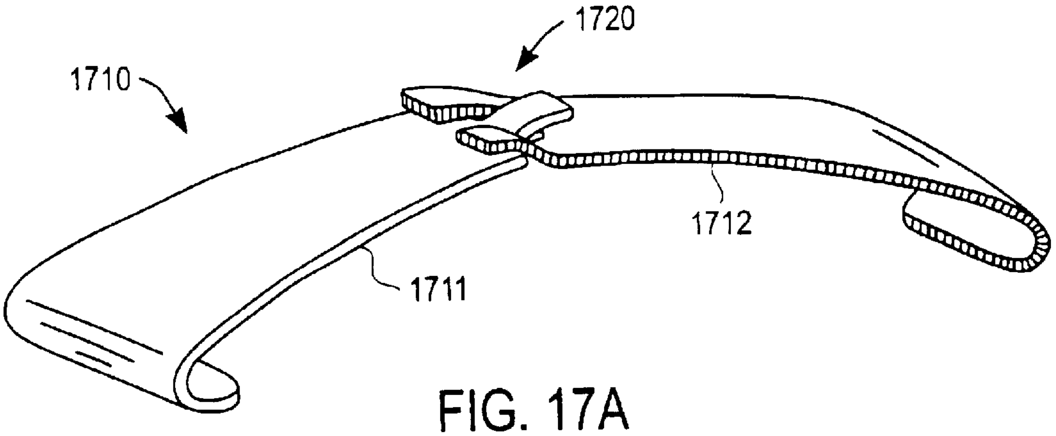
FIG. 17A illustrates an embodiment of a two piece spring.

FIG. 17A illustrates an embodiment of a two piece spring. In one embodiment, spring 1710 may be formed using two component pieces 1711 and 1712 that may coupled together using interlocking fingers 1720. Interlocking fingers 1720 operate as a hinge mechanism. This may facilitate the buckling of spring 1710, thereby reducing the actuation force required to depress spring 1710.

Figure 17B:
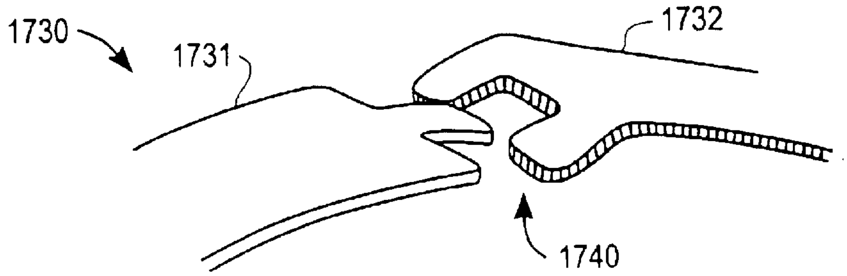
FIG. 17B illustrates another embodiment of a two piece spring.
Figure 17C:
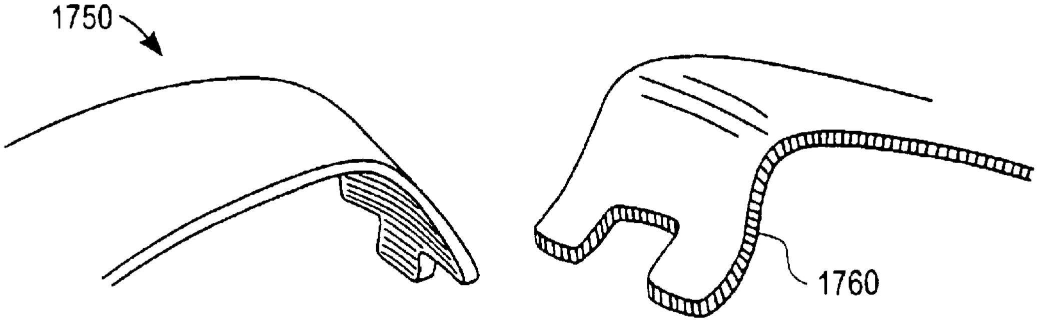
FIG. 17C illustrates yet another embodiment of a two piece spring.

FIG. 17B illustrates another embodiment of a two piece spring. Spring 1730 may be formed using components 1731 and 1731 that that may coupled together using interlocking fingers 1740. Interlocking fingers 1740 are bent downward, toward the direction of depression. In this orientation, the fingers are less restrictive to the downward motion of spring 1730. In an alternative embodiment, the interlocking fingers 1760 may be extended to operate as a flexure to increase lateral compliance of spring 1750, thereby reducing the required actuation force, as illustrated in FIG. 17C.

Figure 18A:
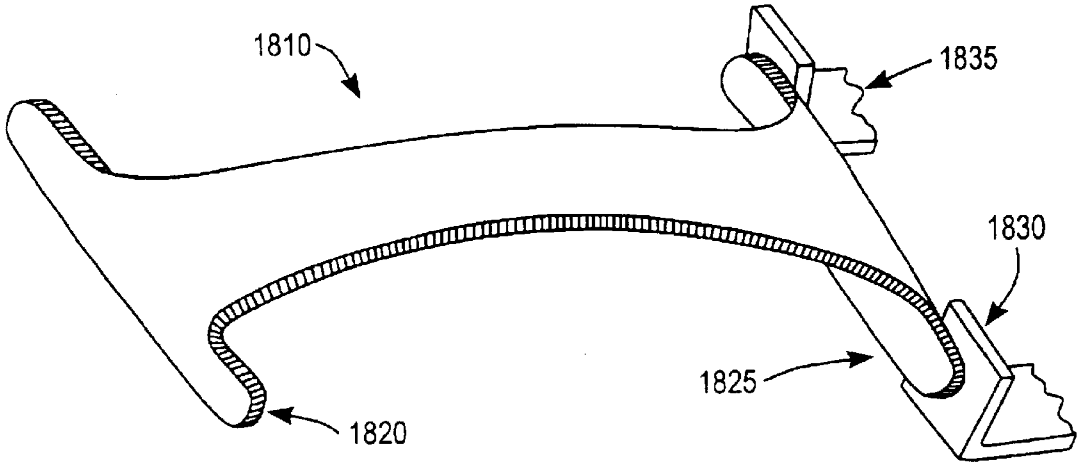
FIG. 18A illustrates an embodiment of a unitary body spring without a central bump.
Figure 18B:
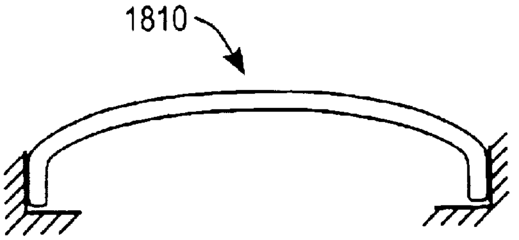
FIG. 18B illustrates a side view of a unitary body spring without a central bump, in an un-compressed state.
Figure 18C:
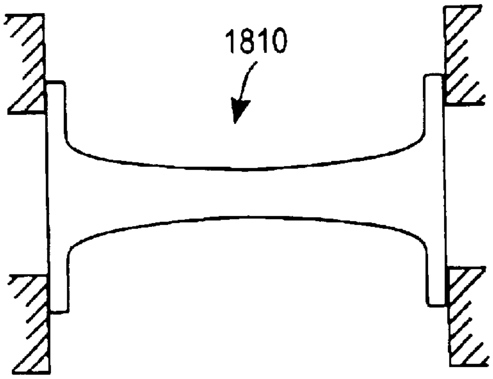
FIG. 18C illustrates a top view of a unitary body spring without a central bump, in an un-compressed state.
Figure 18D:
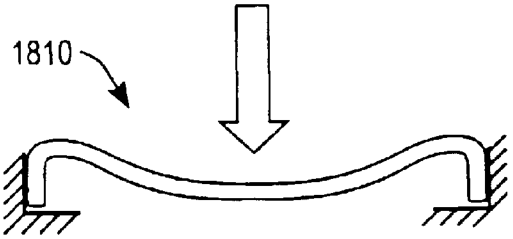
FIG. 18D illustrates a side view of a unitary body spring without a central bump, in a compressed state.
Figure 18E:
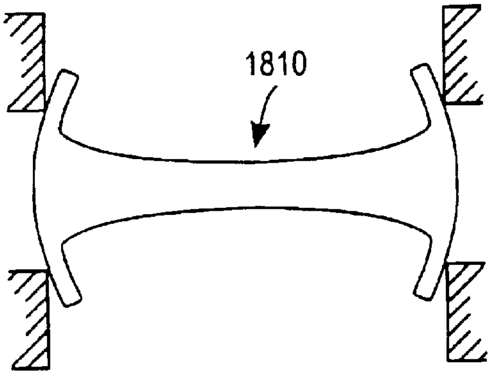
FIG. 18E illustrates a top view of a unitary body spring without a central bump, in a compressed state.

FIG. 18A illustrates an embodiment of a unitary body spring without a central bump. Spring 1810 may not have a bump integrated into its body. Spring 1810 may be bowed and may have horizontal flexures 1820 and 1825 protruding from its ends. Flexures 1820 and 1825 mate against features (e.g., tabs) 1835 and 1830 on a base plate (not shown). Flexures 1820 and 1825 bend when spring 1810 is compressed, thereby reducing the required actuation force. Side and top views of spring 1810 are illustrated in FIG. 18B and FIG. 18C, respectively. Side and top views of spring 1810 in a compressed state, that show the bending of flexures 1820 and 1825, are illustrated in FIG. 18D and FIG. 18E, respectively.

Figure 19A:
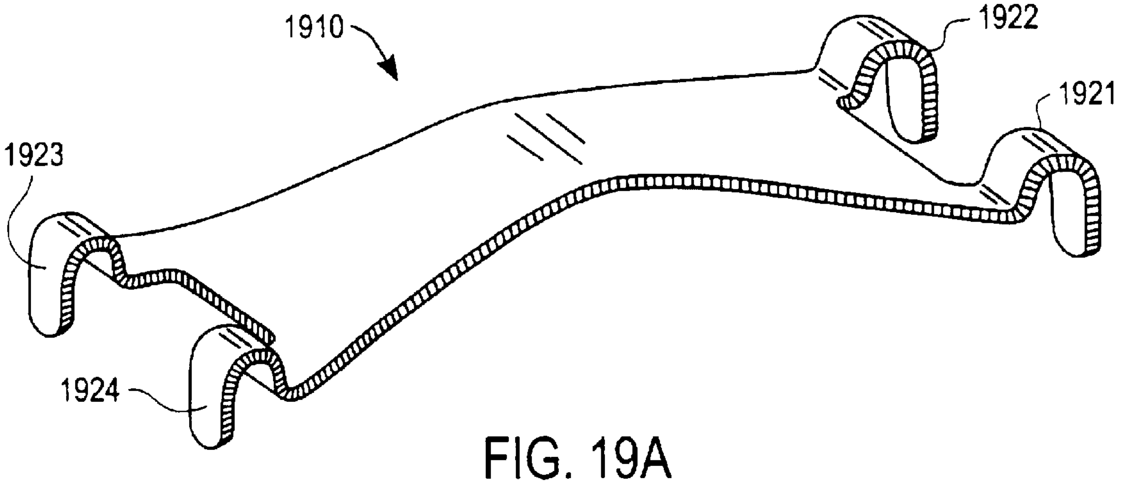
FIG. 19A illustrates an alternative embodiment of a unitary body spring without a central bump.
Figure 19B:
FIG. 19B illustrates a side view of an embodiment of a unitary body spring without a central bump in an un-compressed state.
Figure 19C:
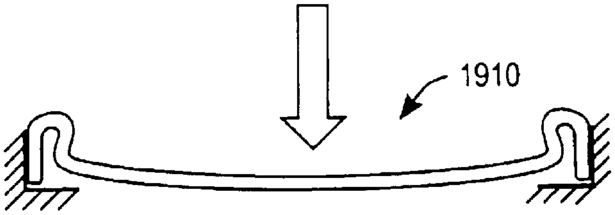
FIG. 19C illustrates a side view of an embodiment of a unitary body spring without a central bump in a compressed state.

FIG. 19A illustrates an alternative embodiment of a unitary body spring without a central bump. In one embodiment, spring 1910 may be bowed and have four vertical flexures 1921–1924 at its corners. Flexures 1921–1924 bend when spring 1910 is compressed, thereby reducing the required actuation force. FIG. 19B illustrates a side view of spring 1910 in an un-compressed state. FIG. 19C illustrates a side view of spring 1910 in a compressed state.

Figure 20A:
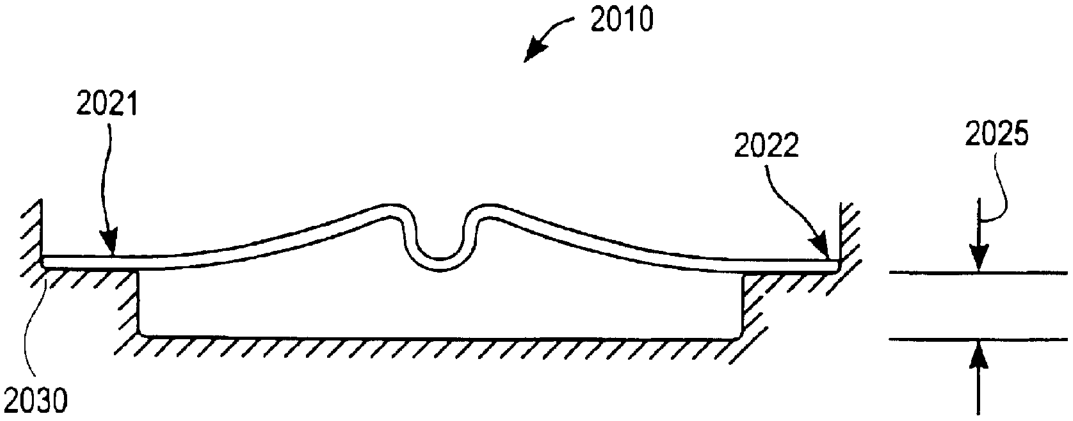
FIG. 20A illustrates an embodiment of a unitary body spring in relation to a base.

FIG. 20A illustrates an embodiment of a unitary body spring in relation to a base. Spring 2010 has non-curled ends 2021 and 2022. Features on base plate 2030 replace the function of curled ends. Ends 2021 and 2022 of spring 2010 are raised a distance 2025 above the bottom of base plate 2030 so that spring 2010 may buckle and go over-center.

Figure 20B:
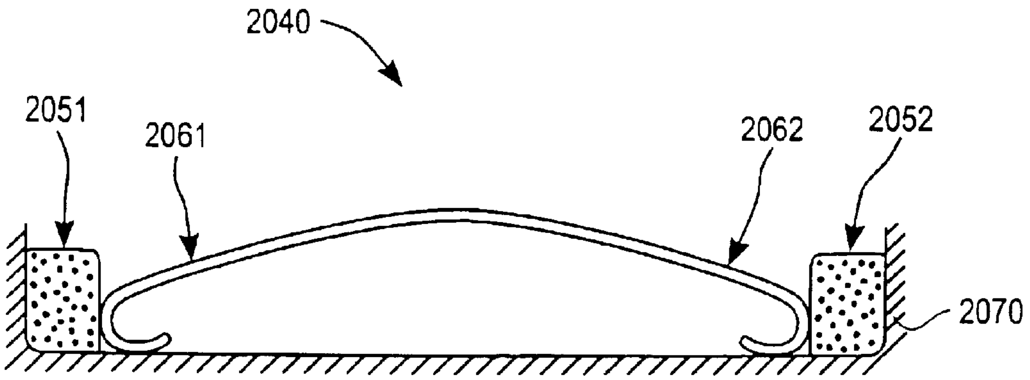
FIG. 20B illustrates another embodiment of a unitary body spring in relation to a base.

FIG. 20B illustrates another embodiment of a unitary body spring in relation to a base. In one embodiment, components 2051 and 2052 may be placed between the ends 2061 and 2062, respectively, of spring 2040 and base 2070. Components 2051 and 2052 may be constructed from a compliant material, such as rubber or foam, to provide additional lateral compliance to spring 2040.

Figure 13:
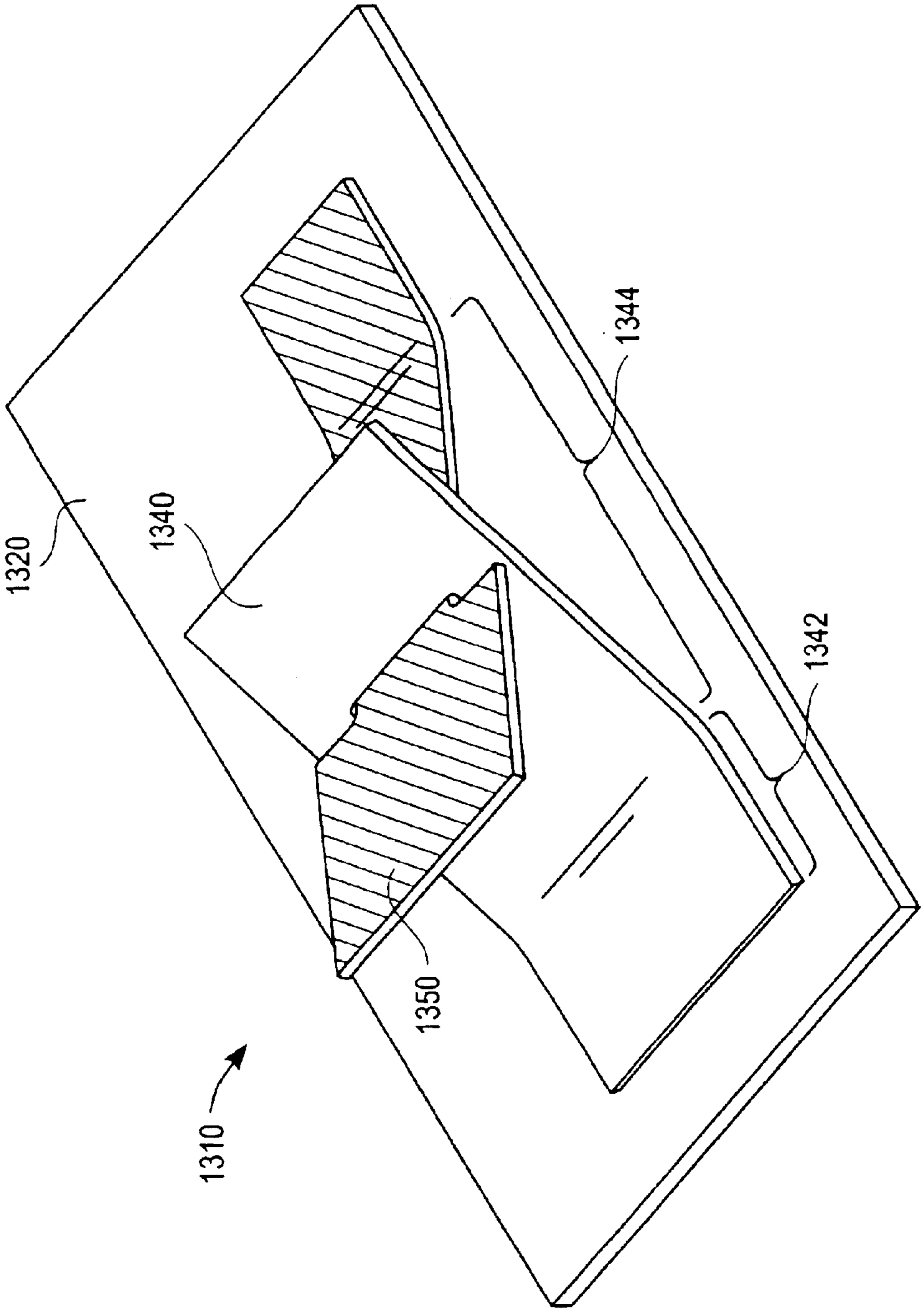
FIG. 13 illustrates one embodiment of a keyswitch having legs comprising leaf springs.

FIG. 13 illustrates an embodiment of a keyswitch having legs comprising leaf springs. In one embodiment, keyswitch 1310 may include base 1320 and legs 1350 and 1340. Legs 1340 and 1350 each have an end coupled to base 1320 and another end extending away from base 1320. For example, leg 1340 has end 1342 coupled to base 1320, and end 1344 extending away from the base. Legs 1340 and 1350 have a cantilevered structure to support parallel up and down movement of a cap (not shown) coupled to them.

Legs 1340 and 1350 are leaf springs in that they operate to provide the function of a spring without the use of a separate spring component. The thickness and resilience of the material selected for the legs are among the factors that determine the spring-like function. Leg 1350 may be a T-shaped member and leg 1340 may be a slotted member configured to accept the insertion of leg 1350.

Figure 14:
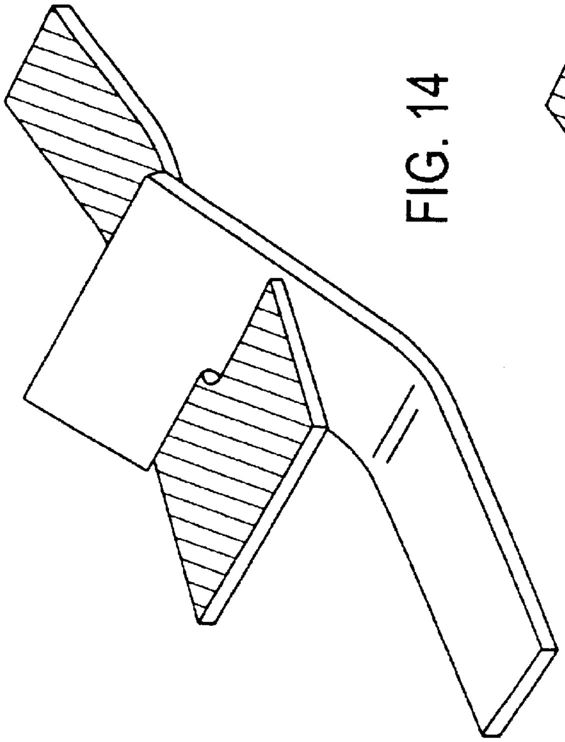
FIG. 14 illustrates another embodiment of a keyswitch having legs comprising leaf springs.
Figure 15:
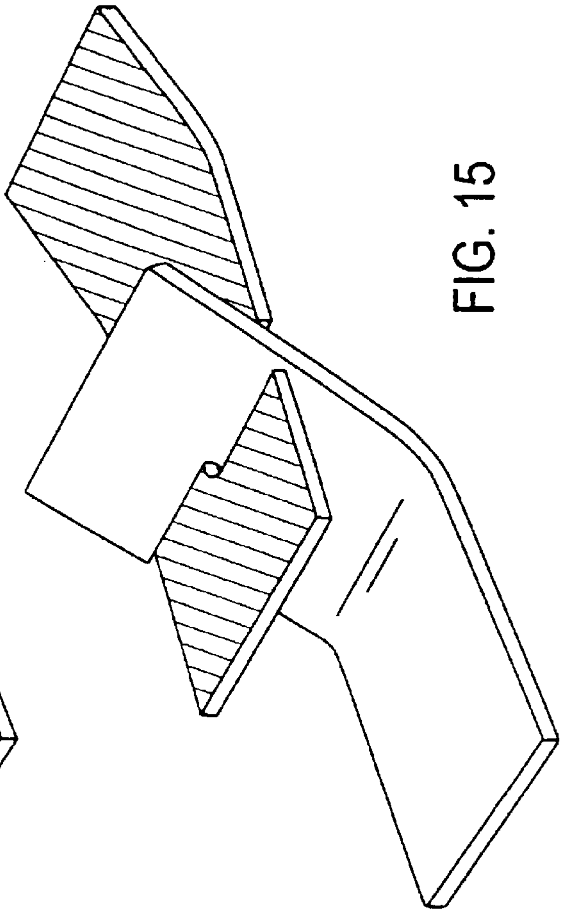
FIG. 15 illustrates yet another embodiment of a keyswitch having legs comprising leaf springs.

In alternative embodiments, the legs may have other shapes to provide for engagement between them, for examples, L-shaped and C-shaped as illustrated in FIGS. 14 and 15, respectively.

Figure 16:
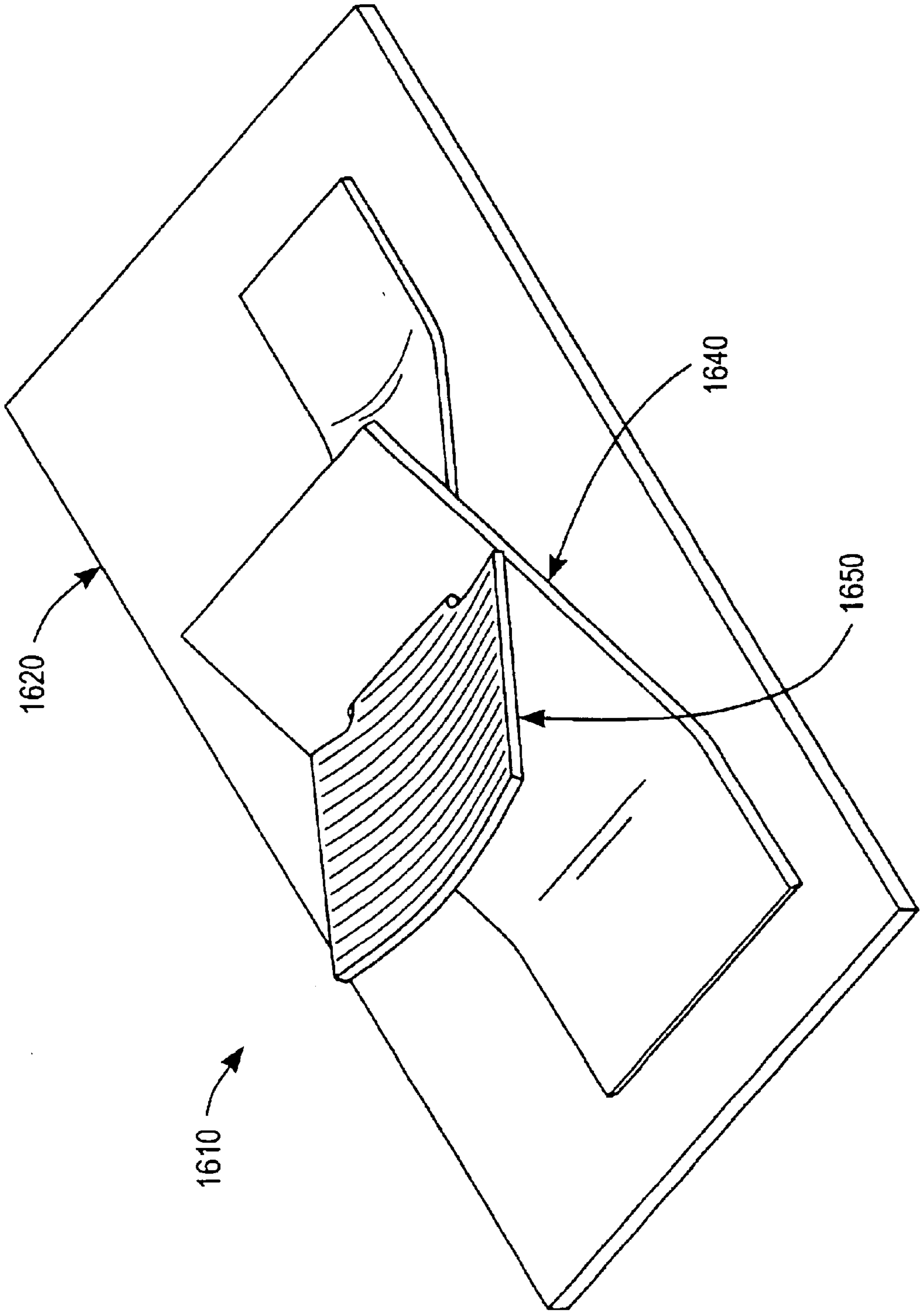
FIG. 16 illustrates one embodiment of a keyswitch having a bowed leg.

FIG. 16 illustrates an alternative embodiment of a keyswitch having legs comprising leaf springs. Keyswitch 1610 includes base 1620 and legs 1640 and 1650. In one embodiment, leg 1650 may be bowed. The bowed leg 1650 buckles when compressed to provide a tactile feedback response. The bowed shape allows for a strong leg having a large amount of travel while minimizing the overall thickness of the keyswitch 1610. Additional advantages of a bowed leg may include being able to remain in a collapsed position without significant degradation compared with springs that are non-integrated with the leg and maintenance of a consistent feel from key to key over many cycles of use.

In one embodiment, the keyswitches described herein may be designed into a collapsible keyboard as described in U.S. Pat. No. 6,331,850 to Olodort, et al. and co-pending U.S. patent application Ser. No. 09/540,669, both assigned to the same assignee of the present application, which are herein incorporated by reference. For example, the base of the keyswitch may be designed in a keyboard assembly that is capable of collapsing into its own protective housing having two symmetrical hollow box-shaped members, opened on one side. When closed, it forms a dust-proof enclosure surrounding a keyboard mechanism. In the collapsed state, the keyboard assembly can be carried in a purse or coat pocket along with a palmtop computer or other information appliance, such as a cellular phone. Its small size allows it to be conveniently stowed inside an appliance, such as a desktop telephone or television. When used with desktop computers or other information appliances, the collapsed state may be used to better utilize desk space when the computer is not in operation.

In one particular embodiment, the mechanical action of the keyswitches may be designed to feel virtually the same as keyswitches in a desktop keyboard, so the user can touch-type quickly and comfortably with no learning required. The keys of, for example, an 84-key keyboard are arranged in the standard "QWERTY" layout, with key tops being full sized. The center-to-center pitch of the keys is the standard 19 mm. The distance from the left edge of the left-most key to the right edge of the right-most key is about 11 inches. Key travel (the distance the key moves when pushed down) is approximately 3 mm. When a key is pressed there is an over-center "buckling" of a spring to create tactile feedback as described above.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A keyswitch, comprising:

a plurality of legs interleaved together without a pivot point approximately central to the plurality of legs, each of the plurality of legs having a bottom surface;

a spring to engage at least one of the bottom surfaces of the plurality of legs;

a keycap disposed above the plurality of legs; and a base plate disposed below the spring.

2. The keyswitch of claim 1, wherein the spring engages both of the bottom surfaces of the plurality of legs.

3. The keyswitch of claim 2, wherein the spring is constructed from a material comprising a metal.

4. The keyswitch of claim 2, wherein the plurality of legs is constructed from a material comprising a metal.

5. The keyswitch of claim 1, wherein the spring is constructed from a material comprising a metal.

6. The keyswitch of claim 1, wherein the plurality of legs is constructed from a material comprising a metal.

7. The keyswitch of claim 1, wherein each of the plurality of legs has a center and wherein each of the plurality of legs is undulated at approximately its center.

8. A keyswitch, comprising:

a plurality of legs interleaved together and having sides without flanges;

a key cap disposed above the plurality of legs; and a base plate disposed below the plurality of legs, wherein the plurality of legs is constructed from a material comprising a metal.

9. The keyswitch of claim 8, wherein each of the plurality of legs has a center and wherein each of the plurality of metal legs is undulated at approximately its center.

10. The keyswitch of claim 8, wherein each of the plurality of legs has a bottom surface and wherein the keyswitch further comprises a spring to engage at least one of the bottom surfaces of the plurality of legs.

11. The keyswitch of claim 10, wherein the spring engages both of the bottom surfaces of the plurality of legs.

12. The keyswitch of claim 11, wherein the spring engages both of the bottom surfaces of the plurality of legs.

13. The keyswitch of claim 8, wherein each of the plurality of legs has a constant thickness.

14. The keyswitch of claim 13, wherein the thickness of one of the plurality of legs is less than approximately 1 millimeter.

15. A keyswitch, comprising:

a plurality of legs interleaved together without a pivot point approximately central to the plurality of legs to form a scissor-like arrangement, the plurality of legs having sides without flanges.

16. The keyswitch of claim 15, further comprising a base and wherein the plurality of legs are pivotally engaged with the base.

17. The keyswitch of claim 16, wherein lateral movement of the plurality of legs is constrained at the base.

18. The keyswitch of claim 15, wherein each of the plurality of legs has a bottom surface and wherein the keyswitch further comprises:

a spring to engage at least one of the bottom surfaces of the plurality of legs.

19. A keyswitch comprising:

first and second legs each having a first end and a second end, the first end having two lower protrusions and the second end having upper protrusions, the lower protrusions of the second leg disposed between the lower protrusions of the first leg without a central pivot; and a base having a plurality of retaining clips, each of the lower protrusions of the first and second legs pivotally engaged with a corresponding one of the plurality of retaining clips, and each of the upper protrusions extended towards a cap.

20. The keyswitch of claim 19, wherein the first and second legs each have bottom surfaces and wherein the keyswitch further comprises a spring coupled to the base, the spring to engage at least one of the bottom surfaces of the plurality of legs.

21. The keyswitch of claim 20, wherein the spring engages both the bottom surfaces of the plurality of legs.

22. The keyswitch of claim 19, wherein the first and the second legs each have a center and wherein the first and the second legs are undulated at approximately their centers.

23. The keyswitch of claim 19, wherein each of the upper protrusions has a slot and wherein the cap has a plurality of tabs, each of the plurality of tabs pivotally coupled to a corresponding slot, each of the plurality of tabs being able to translate with movement of keyswitch.

24. The keyswitch of claim 19, wherein each of the upper protrusions overlap a corresponding lower protrusion to form a scissor-like arrangement.

25. A keyswitch, comprising:

first and second legs each having a first end and a second end, the first end and the second end being separated in height by less than approximately 1 millimeter to reduce a thickness of the keyswitch.

26. The keyswitch of claim 25, wherein the first and the second legs each have a constant thickness.

27. The keyswitch of claim 26, wherein the thickness of the first leg is approximately 0.25 millimeters.

28. The keyswitch of claim 25, wherein the height exists when the keyswitch is not depressed.

29. A keyswitch, comprising:

a cap; and a plurality of legs supporting the cap, each of the plurality of legs being a leaf spring that has a cantilevered structure formed by the plurality of legs engaged to each other to support parallel up and down movement of the cap.

30. The keyswitch of claim 29, wherein the plurality of legs are metal.

31. The keyswitch of claim 29, wherein one of the plurality of legs is bowed.

32. The keyswitch of claim 29, wherein the bowed leg buckles when compressed to provide tactile feedback.

33. The keyswitch of claim 29, wherein an end of each leg is attached to a support and the cap is capable of vertical movement relative to the support, and wherein a first plane defined by the cap and a second plane defined by the support remain substantially parallel to each other during movement of the cap.

34. A keyswitch, comprising:

a support;

a cap having a top and a bottom; and a pair of legs coupled to the bottom of the cap and coupled to the support, and wherein the keyswitch has a height, when fully depressed of less than approximately 2.5 millimeters from the top to the support to reduce a thickness of the keyswitch.

* * * * *